May 12, 1970 A. GAISSER ETAL 3,511,938

IMPULSE TRANSMITTER FOR TELEPHONE AND TELEWRITER INSTALLATIONS

Filed Sept. 28, 1966 17 Sheets-Sheet 1

INVENTORS
AUGUST GAISSER
WILLI WEBER

BY

Kenyon & Kenyon
ATTORNEYS

May 12, 1970 A. GAISSER ETAL 3,511,938

IMPULSE TRANSMITTER FOR TELEPHONE AND TELEWRITER INSTALLATIONS

Filed Sept. 28, 1966 17 Sheets-Sheet 2

INVENTORS
AUGUST GAISSER
WILLI WEBER

BY Kenyon & Kenyon
ATTORNEYS

INVENTORS
AUGUST GAISSER
WILLI WEBER

BY

Kenyon & Kenyon
ATTORNEYS

INVENTORS
AUGUST GAISSER
WILLI WEBER

BY

Kenyon & Kenyon
ATTORNEYS

IMPULSE TRANSMITTER FOR TELEPHONE AND TELEWRITER INSTALLATIONS

Filed Sept. 28, 1966

INVENTORS
AUGUST GAISSER
WILLI WEBER
BY
Kenyon & Kenyon
ATTORNEYS

INVENTORS
AUGUST GAISSER
WILLI WEBER
BY Kenyon & Kenyon
ATTORNEYS

IMPULSE TRANSMITTER FOR TELEPHONE AND TELEWRITER INSTALLATIONS

Filed Sept. 28, 1966 17 Sheets-Sheet 7

INVENTORS
AUGUST GAISSER
WILLI WEBER

BY Kenyon & Kenyon
ATTORNEYS

INVENTORS
AUGUST GAISSER
WILLI WEBER

BY

Kenyon & Kenyon
ATTORNEYS

INVENTORS
AUGUST GAISSER
WILLI WEBER

BY

Kenyon & Kenyon
ATTORNEYS

IMPULSE TRANSMITTER FOR TELEPHONE AND TELEWRITER INSTALLATIONS

Filed Sept. 28, 1966

INVENTORS
AUGUST GAISSER
WILLI WEBER

BY Kenyon & Kenyon
ATTORNEYS

INVENTORS
AUGUST GAISSER
WILLI WEBER

BY
Kenyon & Kenyon
ATTORNEYS

IMPULSE TRANSMITTER FOR TELEPHONE AND TELEWRITER INSTALLATIONS

Filed Sept. 28, 1966 17 Sheets-Sheet 12

INVENTORS
AUGUST GAISSER
WILLI WEBER

BY Kenyon & Kenyon
ATTORNEYS

IMPULSE TRANSMITTER FOR TELEPHONE AND TELEWRITER INSTALLATIONS

Filed Sept. 28, 1966 17 Sheets-Sheet 13

INVENTORS
AUGUST GAISSER
WILLI WEBER

BY

Kenyon & Kenyon
ATTORNEYS

May 12, 1970 A. GAISSER ET AL 3,511,938

IMPULSE TRANSMITTER FOR TELEPHONE AND TELEWRITER INSTALLATIONS

Filed Sept. 28, 1966 17 Sheets-Sheet 14

INVENTORS
AUGUST GAISSER
WILLI WEBER

BY Kenyon & Kenyon
ATTORNEYS

IMPULSE TRANSMITTER FOR TELEPHONE AND TELEWRITER INSTALLATIONS

INVENTORS
AUGUST GAISSER
WILLI WEBER

BY

Kenyon & Kenyon
ATTORNEYS

INVENTORS
AUGUST GAISSER
WILLI WEBER

BY Kenyon & Kenyon
ATTORNEYS

IMPULSE TRANSMITTER FOR TELEPHONE AND TELEWRITER INSTALLATIONS

Filed Sept. 28, 1966 17 Sheets-Sheet 17

INVENTORS
AUGUST GAISSER
WILLI WEBER

BY Kenyon & Kenyon
ATTORNEYS

United States Patent Office 3,511,938
Patented May 12, 1970

3,511,938
IMPULSE TRANSMITTER FOR TELEPHONE AND TELEWRITER INSTALLATIONS

August Gaisser, Ehingerstrasse, Aach, Hegau, Germany, and Willi Weber, Borriesriedstr. Volkertshausen, Germany Filed Sept. 28, 1966, Ser. No. 582,564
Claims priority, application Germany, Feb. 12, 1966, T 30,445
Int. Cl. H04m *1/28*
U.S. Cl. 179—90 28 Claims

ABSTRACT OF THE DISCLOSURE

A device for transmitting pulses in telephone and telewriting installations. A number store is provided having mechanical scanning members which are moved by a mechanical drive to actuate a clutch. The clutch connects the drive with the winder of an impulse transmitter of a number dial until the distance determined by the number store is traversed, and then releases it for impulse transmission. The number store includes a plurality of projections whose horizontal spacing from the starting position of a scanning member determines the series of pulses, and scanning is carried out in at least two planes at right angles to one another.

The invention relates to a device for transmitting current pulses formed by an impulse transmitter and a number dial in telephone and telewriting installations. The number dial is wound by a mechanical drive, and a power storing means formed by a spring is more or less tensioned with different amounts of movement corresponding to different spring tensions. On the return movement the stored energy drives the impulse transmitter which is built into the number dial. The series of pulses transmitted into the telephone or telewriter network then make the connection with the selected subscriber.

Impulse transmitters driven by a mechanical drive are known which actuate control dials. Combinations are fixed on the control dials and a series of current pulses are transmitted by a scanning of the control dials. It is a disadvantage of this arrangement that, independently of the circumference of a control dial only limited number of control combinations can be provided. If it is desired to select subscriber numbers with many digits e.g. eighteen to twenty numbers and in these numbers many figures, for example 0, nine, eight and so on are present, these figures require many current pulses and the large number of such figures to be transmitted requires such a long scanning path that such instruments for manufacturing reasons and because of the space occupied are no longer economical to produce.

Other devices for transmitting current pulses require a slider to be shifted by hand in order to scan a definite control combination. After the position on the scanning area which is to be scanned has been reached, the driving mechanism must then be started by a further lever or by a key. This arrangement is disadvantageous as the selecting operation cannot be initiated by one pressure on a key but only by at least two key pressures. Since the time taken in selecting should be reduced and incorrect selection must be avoided these devices have not been successful.

Arrangements in which printed circuits have been used for the scanning operation instead of openings in control dials have the disadvantage that when the subscriber numbers are altered the whole dial on which the control combinations are mounted becomes useless, thus adding to expense. Moreover, special devices were necessary which for the most part cannot be serviced by unskilled operators in order to fit new control combinations to such control dials e.g. by stamping or some other electro-mechanical operations.

The present invention is concerned wtih the problem of providing a device for transmitting current pulses which avoids the disadvantages of known arrangements. In particular it must be possible with one key pressure to initiate the whole selecting operation which then in a known manner proceeds automatically. Moreover the device must be simple and inexpensive to produce; the space required must not be too great; sufficient reliability of operation must be ensured and when subscribers' numbers are altered it must be possible for a layman to change the subscriber numbers by a simple displacement.

The scanning operation should be mechanical and not electronic as the use of audio frequency bands which are recorded by microphones is disadvantageous as regards their useful life, and an instrument using vacuum tubes and amplifiers cannot operate with the same reliability as one which makes use of a purely mechanical scanning.

The solution of the problem according to the invention consists in providing a number store the scanning members of which are moved by a mechanical drive and actuate a clutch. The clutch connects the drive with the winder of the transmitter of a number dial until the distance determined by the number store is traversed and thereupon releases it for impulse sending.

For this feature a completely novel method is used. For impulse transmitting purposes the impulse transmitter of a number dial is used. This impulse transmitter, which is present in every number dial and consists of contacts to be alternately opened and closed, is a structural element which is suited to all the pulse amplifying or transmitting members in the telewriter and telephone network. If transmitters are used which are specially constructed for the device then any additional inductances or capacitances can cause distortion of the pulse series and reliability of operation suffers. In the new device the manual operation of the selection of the number dial is replaced by a mechanical operation. An essential feature of the invention is that a clutch is provided between this transmitter and a mechanical drive which is actuated by scanning members which scan a number store.

The clutch must thus scan and transmit preselected control combinations to the clutch and also must effect the switching of the impulse transmitter in such a manner that no loss of time occurs i.e. the selecting operation must be carried out without pause as postal conditions require.

It is essential that the number store be formed by projections whose horizontal spacing from the starting position of one of the horizontally moved scanning members determines the pulse series itself or the numbers, and whose vertical spacing from one another corresponds to a different series of current pulses or numbers.

In order to permit the transmission of many numbers in the small space available, scanning is carried out in at least two planes at right angles to one another.

In the known arrangements scanning took place in only one plane i.e. along the periphery of the control dial which represented the number store. Scanning in two perpendicular planes corresponds roughly to the setting operation of a rotary selector switch, requires less space and less preparation time and permits the number store to be easily set by hand. Different operations are associated with every plane of this number store. In the last mentioned arrangement it is expedient that the scanning member movable in a horizontal plane and scanning projections should actuate through a cam a feed pawl which moves the number store upwards a distance which corresponds to the distance by which the projections are separated from one another.

With this arrangement the selecting operation is carried out in minimum time. Depending on the distance through which the scanning member moves in a horizontal direction from its initial position until it contacts the projection, the number dial or its impulse transmitter is wound through a shorter or longer amount so that on running down of the impulse transmitter a nought, one, or another number is connected in series of pulses to pass into the telephone or telewriter network. While such impulse transmission is taking place, the number store is at the same time being brought into the next scanning position so that the next scanning can take place immediately thereafter. This possibility exists because the scanning member operates a feed pawl for example by means of a cam.

A preferred construction of the number store consists in forming it of flat upright juxtaposed cipher magazines movable up and down in guides. The magazines have at their upper ends a holding nose and thereunder, at right angles to the guide, have cipher pins forming the projections. The scanning member is a bar moved on both sides by rack bars, the height of the bar being less than the distance the cipher pins are separated from one another.

Such cipher magazines which as a whole constitute the number store have cipher pins which are easily adjustable by hand in their distance from the scanning member so that the series of pulses with which each cipher is associated can be adjusted. The number of cipher pins is then equal to the quantity of numbers to be selected.

Easy setting of the cipher pins is obtained as follows. The cipher magazine is of rectangular cross section. On the side remote from the scanning member a rectangular opening is provided for securing the guide pins in the casing and on the side of the scanning member an angled surface is provided which fits in lateral grooves in the cipher pins. A tension spring is arranged thereunder and is adapted to press the cipher pins against the holding nose. Each cipher pin is inserted in an opening like a bayonet lock to the distance from the scanning member which it is desired to select. It is then guided upwards toward a holding nose after engagement in the angled surface member and is thereby held in position.

In order to obtain rapid scanning it is important that the rack bars moving the scanning member be connected with the drive by a toothed wheel and a reversing clutch for reversing the direction of rotation of the driving motor.

The scanning member is thus moved to and fro in the horizontal plane while the cipher magazine is movable up and down in the vertical plane. During the scanning the magazine is moved either by gravity or upwards against the force of gravity by feed pawls by the height of a cipher pin. It is essential for reliability of operation that the reversing clutch be formed by a switch rocker actuating the electric reversing switch, the switch pin of the rocker actuating a drive when the scanning member comes to rest by striking a cipher pin.

The reversing clutch must operate rapidly and exactly in order that the scanning member or the projection of the cipher pin should not suffer any mechanical damage in the scanning operation.

The scanning member moves back different distances according to the ciphers sent. When a nought is transmitted a long path is traversed; when a 1, for example, is transmitted only a short path is traversed. Whether the path is short or long, on contact of the projection of the cipher pin it is essential that the reversal of direction of rotation of the driving motor should proceed at once and that the number dial or the impulse transmitter be able to run down corresponding to the winding movement when the scanning member moves back into its initial position. In order to ensure that reversal of the direction of rotation takes place immediately after the scanning member has traversed a long or short path i.e. in order to save time, it is important that the toothed wheel moving the rack bar be arranged on a shaft which has a driving pin which engages a slot extending parallel to the shaft. Such a slot is provided in a running sleeve which is movable on the shaft. This sleeve has a switch cam which is connected by a driving member with a hollow shaft arranged on the shaft which carries a pinion which meshes with the driving pinion.

The running sleeve serves to ensure that the reversal always occurs immediately at the conclusion of the movement of the scanning member. To assist this purpose of the invention the switch rocker is provided with a transport pin which engages in a transport cam on the shaft. These members are arranged in such manner that with longer winding movement, the switch pin is moved towards the switch nose on the running sleeve, the switch nose on the scanning member making contact being moved against the action of a spring by the switch cam and the driving member also on the switch pin. In this way the reversal of direction of movement of the scanning member takes place independently of the length of the path immediately after the conclusion of the return movement of the impulse transmitter or of the number dial.

A further essential characteristic of the invention is that there is a winding pin arranged on the shaft which on rotation of the shaft takes with it a transmission pin which is connected with a winding pinion. The winding pinion is rotatable independently of the shaft and meshes with the pinion which, corresponding to the number dial, winds up the spring of the impulse transmitter.

The winding pin and the transmission pin correspond in their operation to the finger which in manual selection engages in the number dial and winds up the spring for the impulse transmitter.

Moreover it is essential to the invention that the winding opinion be arranged on a hollow shaft in such manner that in the winding direction it is connected with the shaft by way of the winding pin and on the return movement rotates independently of the shaft.

In order to be able to make use of smaller tolerances in production it is advantageous that in the operative position a space be provided between the winding pin and the transmission pin.

In the time during which the winding pin bears on the transmission pin, other operations take place such as preparing for reversal of the direction of rotation and so on, so that larger tolerances may be provided since exact timing is not essential.

A simplification of service is obtained by the provision of keys corresponding to the separate subscriber numbers which engage control bars to allow the cipher magazines to drop from the inoperative rest position into the starting position and at the same time start the driving motor.

The whole selecting operation is started by pressure of a key so that a very simple service is provided.

In the construction described employing a cipher magazine which drops into the starting position it is essential that the switch for the driving motor should operate with a delay, and that the switch delay should be greater than the time required by the cipher magazine to pass from the inoperative position into the operative position.

For reasons of structural simplicity a friction wheel drive is provided between the shaft and the motor shaft. By means of this transmission switch shocks which might occur in the mechanical drive are diminished.

A further feature resides in the provision of a supporting bar extending under all the cipher magazines which, connected with a toothed segment in the movement by a pawl feed mechanism brings the cipher magazines to be scanned step by step from the working position into the inoperative position.

This bar then moves the cipher magazine which is to be scanned from the working position back into the inoperative position. The movement is effected by means of a toothed segment.

In this form it is essential that the toothed segment, with the supporting bar relieved of weight by means of a tension spring, be rotatable about a holding shaft which carries a further return toothed segment which serves for transporting the cipher magazine in a few large steps from the working position to the inoperative position.

This additional arrangement is necessary if it is desired rapidly to interrupt the already initiated selecting operation for example after the sounding of the busy signal or as a result of an error. The supporting bar then moves the cipher magazine much faster and with a different transmission ratio into the inoperative position.

It is structurally essential for the last mentioned possibility that the return toothed segment should have a few e.g. three teeth which are protected from engagement by the return pin by means of a lever which by pressing a rapidstop key releases the engagement.

It is obviously a matter of choice whether to use three, less or more toothed segments according to how quickly the cipher magazine is to be transported back to the inoperative position on a pressing of the rapidstop key.

In order to prevent the transmission of impulses during the rapid return movement of the telephone selector into the initial position it is essential that mechanical switch cams be secured to the shaft which through lever connections hold the scanning member out of reach of the cipher pins and prevent impulse transmission. The construction according to the invention offers also in simple manner the possibility of interrupting the current surge or pulse transmission for example after the sending of the first selecting numbers of a subscriber in order to hear if the busy signal has already sounded, and by pressing the rapidstop key of beginning the selecting operation again without having to wait until the whole selecting operation has been completed. This possibility of an intermediate stop in accordance with the invention is obtained by connecting a slide with the rack bar moving the scanning member, the end of which bar carries a guide pin so that independently of its path or of the distance of the projection formed by the cipher pin the switch for the driving motor is actuated.

A structurally simple solution is that the guide pin in its to and fro motion travels over a cam member which is located on the end of a holding lever on which bears resiliently a locking pawl which pivotally and movably releases or arrests the switch lever for the switching on and off of the motor.

A simple adjustment is ensured in that the rapidstop key and the intermediate-stop key rotate a switch shaft which moves the locking pawl or the switch lever through lever connections.

In order to obtain satisfactory reliability making use of only one key for the whole selecting operation, it is important that the pivotable subscriber key engage a control bar which has a noise at its end which adjacent the cipher magazine on which the holding nose for the cipher magazine bears in the inoperative position. Further, grooves are provided which serve for engagement of a locking bar which arrests the stationary or operative position of the control bar. On the other end of the control bar is arranged a switch bar which actuates a motor switch with a delay, and has a locking bar which engages in a locking lever which on coming into operation releases the pawl and rachet feed mechanism from the toothed segment until the latter with its support has reached the operative position.

By the simple structural steps described, namely the movement of a control bar and a locking bar, the cipher magazine can drop into its working position by gravity and the motor be switched on after a delay which bridges this period of the falling movement.

A further important feature of the invention resides in the mounting of a switch member at such a distance above the support for the cipher magazines that the magazine moved is raised above the inoperative position until the holding nose of the magazine is above the nose of the control bar so that the support is freed from the weight of the cipher magazine.

A number of cipher magazines e.g. fifty to sixty of them are sufficiently heavy that the withdrawal of the pawl from the toothed segment would cause difficulties for the feed path. By the simple step of arranging a switch member in such manner that the switching occurs only when the cipher magazine has relieved the support of its weight, there is ensured satisfactory operation which is trouble-free over long periods.

It is desirable that the switch member be located on a bell-crank lever which after movement by the support at the same time raises the locking bar and shuts off the motor.

Instead of the cipher magazine above described, it is equally possible to form the projections of the cipher magazines of dials provided with teeth which pivot about an axis.

This arrangement has the disadvantage that the subscriber can no longer easily, simply and by himself change the number store but must order new dials provided with teeth or stamp them out himself when he wants to select other subscriber numbers.

Since according to the invention the mechanism of a number dial is used, one can also connect the pinion for winding the spring by a clutch with a counting dial which corresponds to the number dial.

The great advantage thus attained is that the number dial which can be mechanically wound up by a shaft can also be used for manual operation i.e. if desired a key field and a number dial can be mounted in one instrument without the need for a separate mechanism for manual operation of the number dial but only the number dial itself i.e. the counting dial around the pinion for the winding up operation.

In the last mentioned arrangement there is a possibility of providing a case with recesses and contacts at the upper side for the support of the hand instrument and beneath a key field for the automatic number selection and below a number dial for the manual selection.

The whole arrangement may however be such that the number store with the number selection by key pressure and the number dial for manual operation is incorporated in one instrument.

Embodiments of the invention are illustrated by way of example in the accompanying drawings. Further features of the invention will appear from the drawings and the accompanying description.

In the drawings FIG. 1 shows graphically a telephone instrument on the casing of which are mounted a key field, a number dial, a rapid stop-key and an intermediate stop-key.

Figure 10:
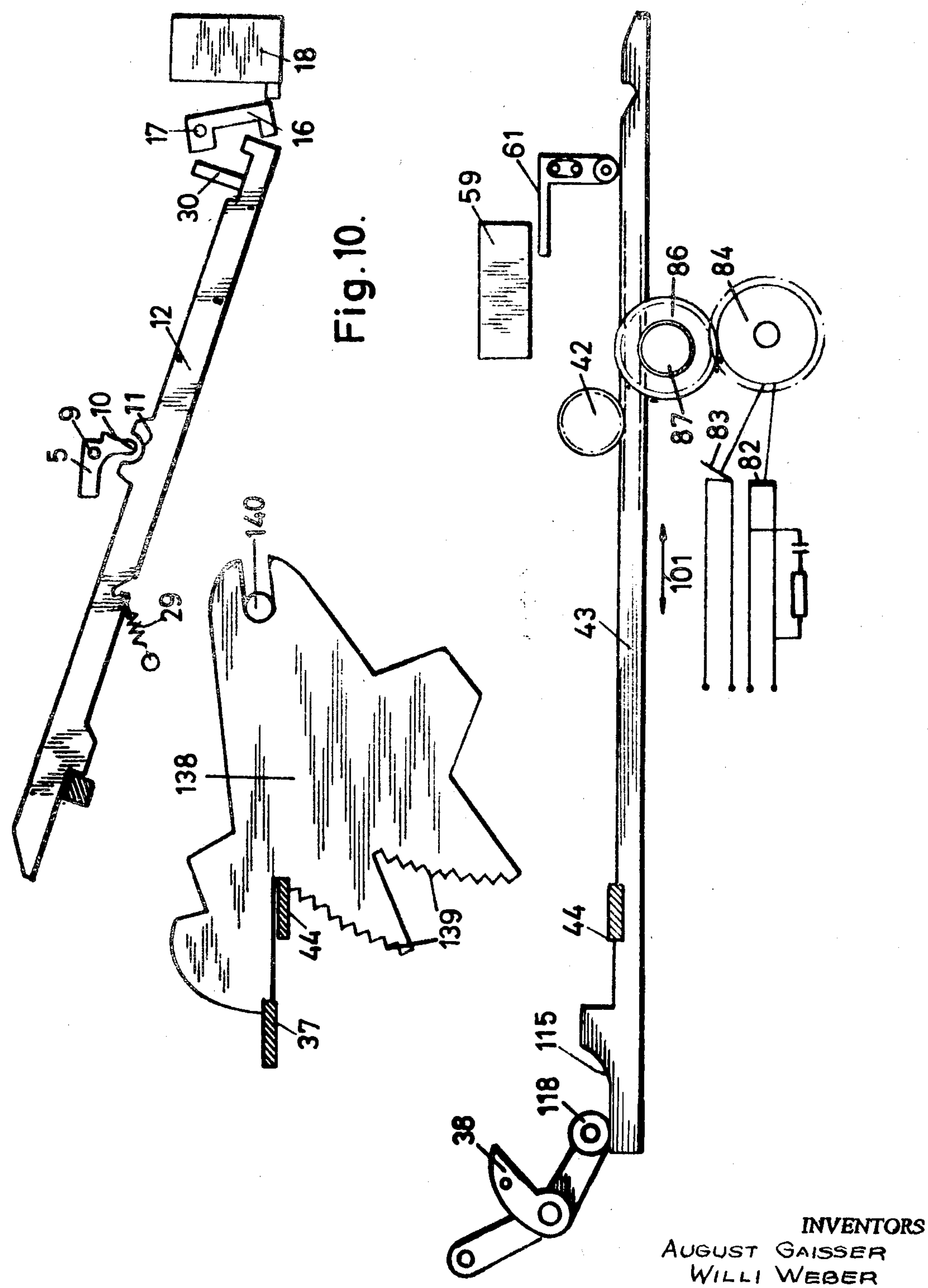
FIG. 10 shows the use of toothed segments as a cipher magazine in a functional diagram.
Figure 11:
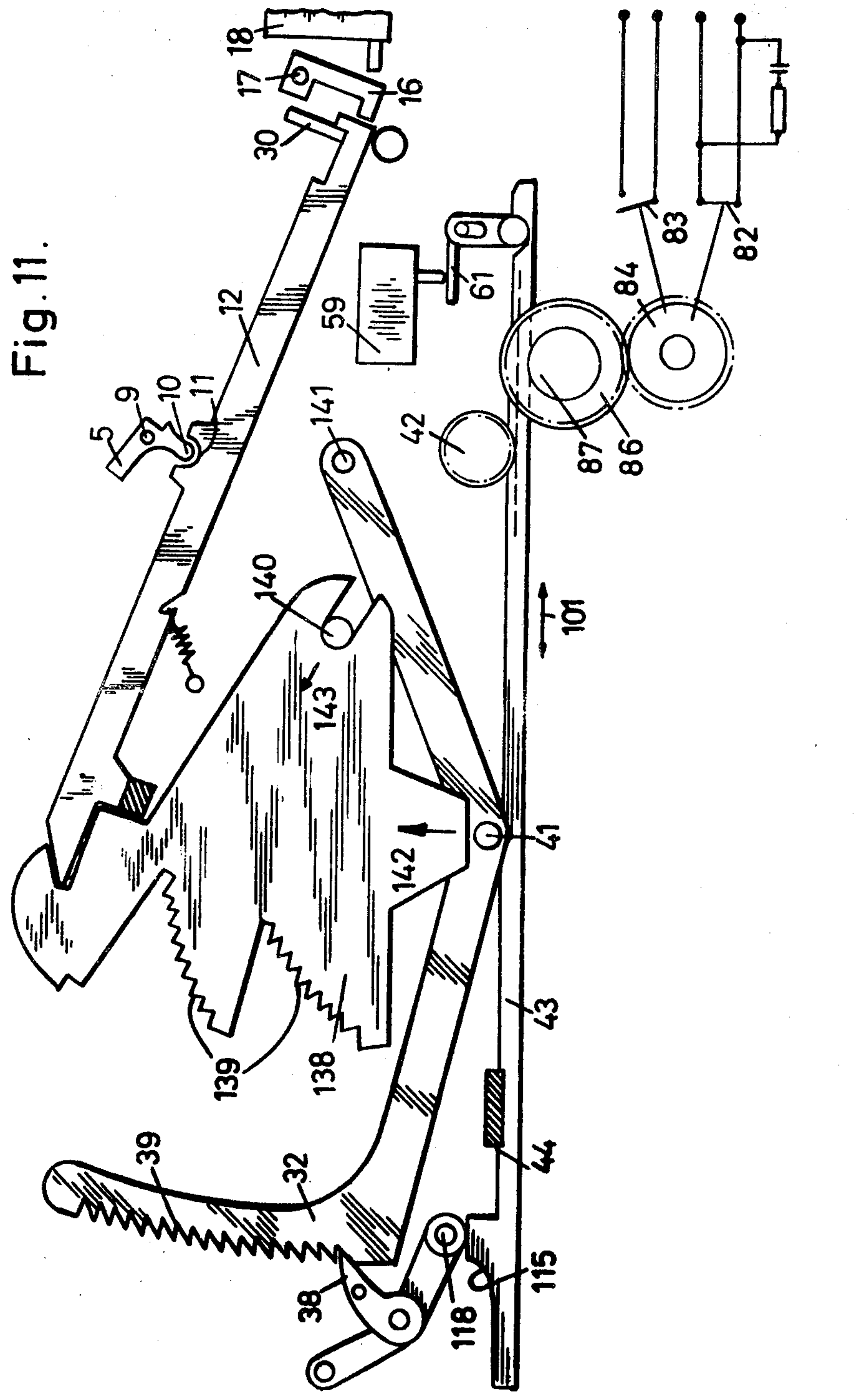

FIG. 11 corresponds to FIG. 10 in another position.

FIG. 12*a–d* show a construction of the cipher magazine, with a cipher pin and the casing for the cipher pins.

Figures 12A, 12B, 12C, 12D, 13:
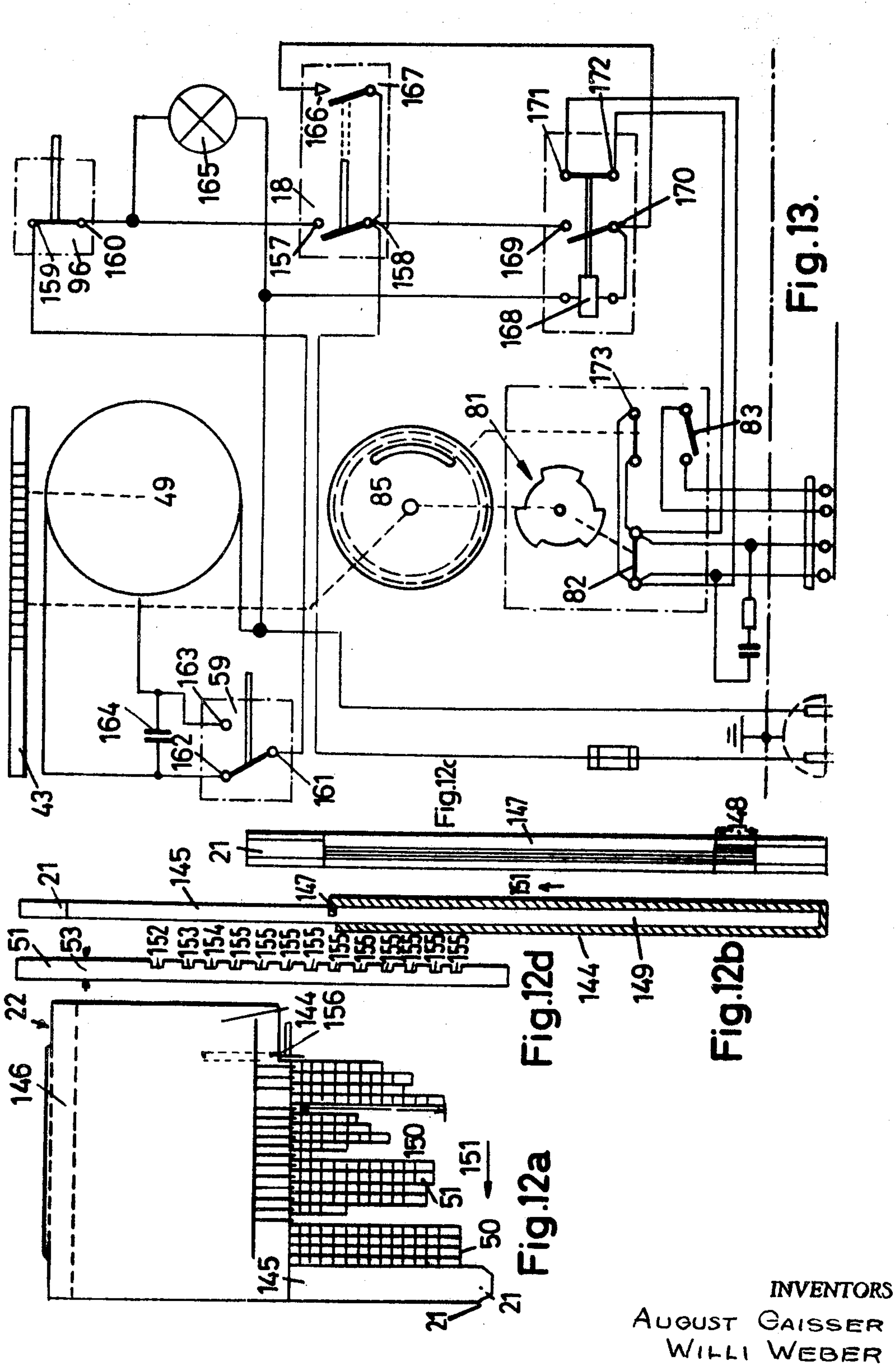

FIG. 13 shows a circuit diagram of the device.

Figure 14:
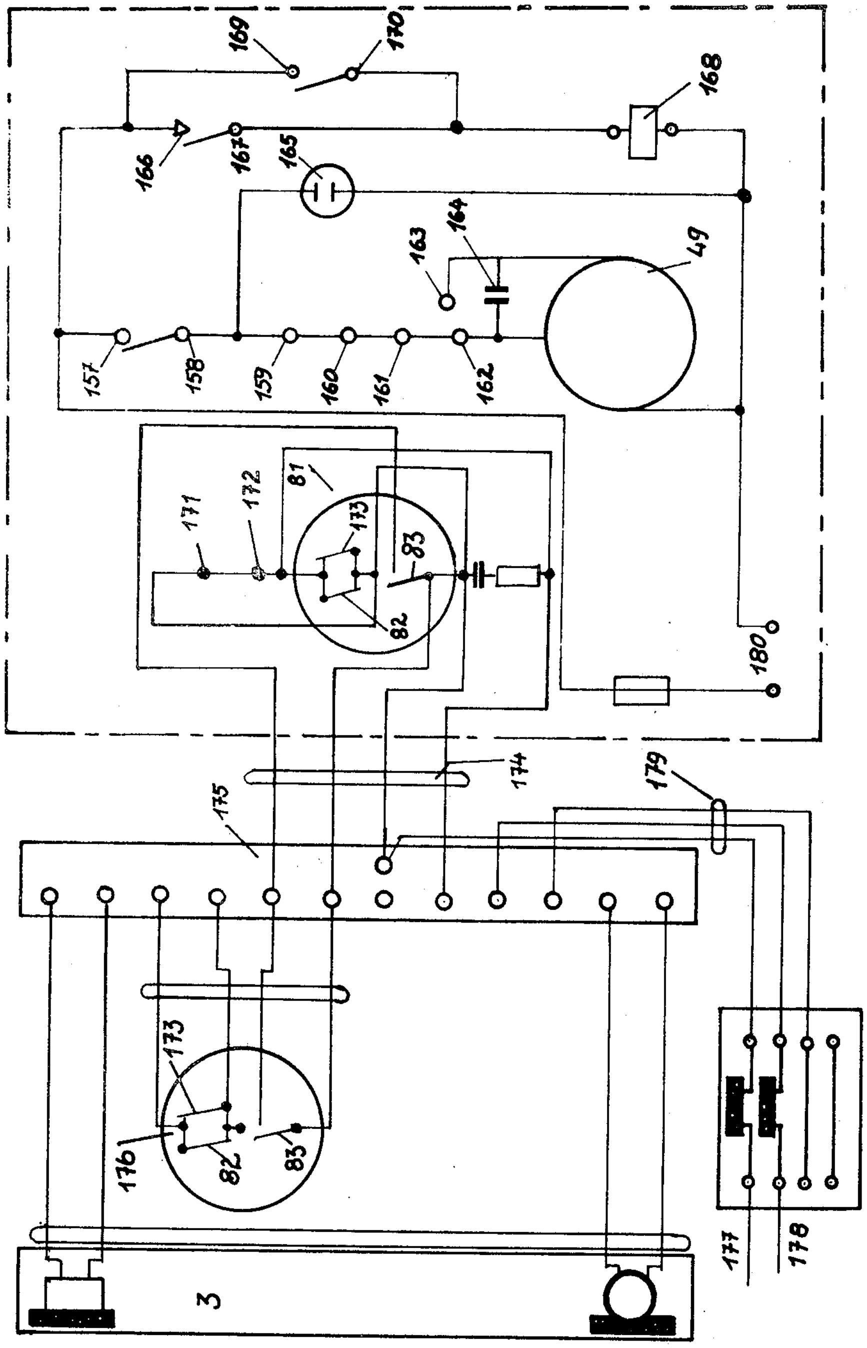

FIG. 14 shows the circuit arrangement in connection with the hand instrument as well as the telewriter or telephone network.

Figure 15:
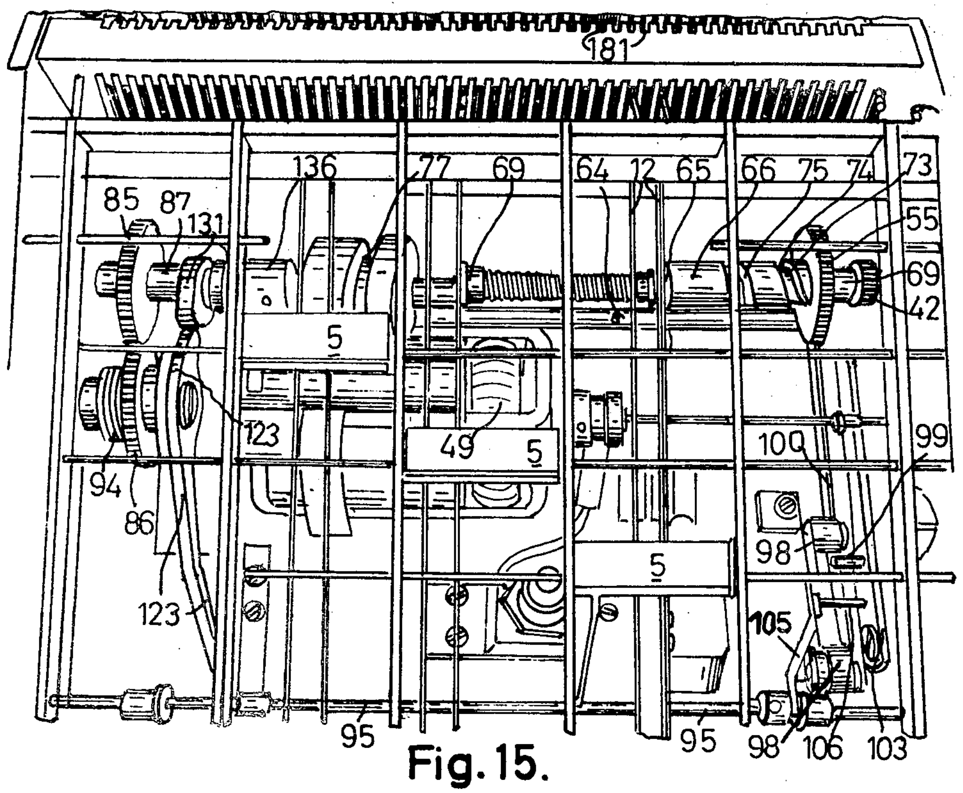

FIG. 15 shows in perspective a top view of the key field of the device with the casing removed.

Figure 16:
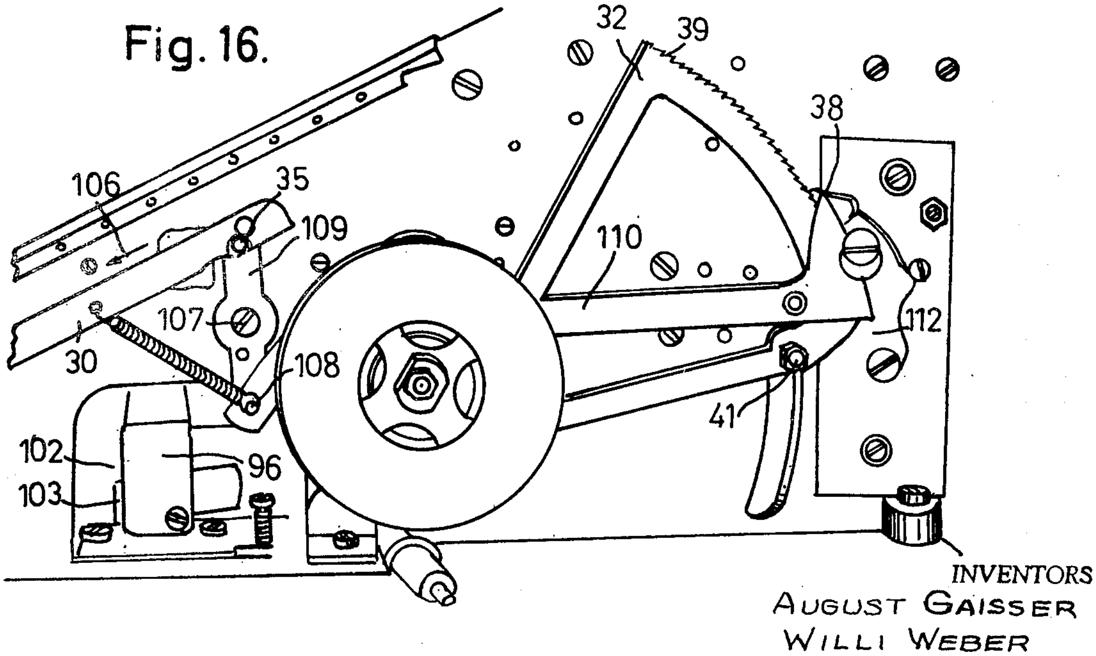

FIG. 16 is a side view from the right of FIG. 15.

Figure 17:
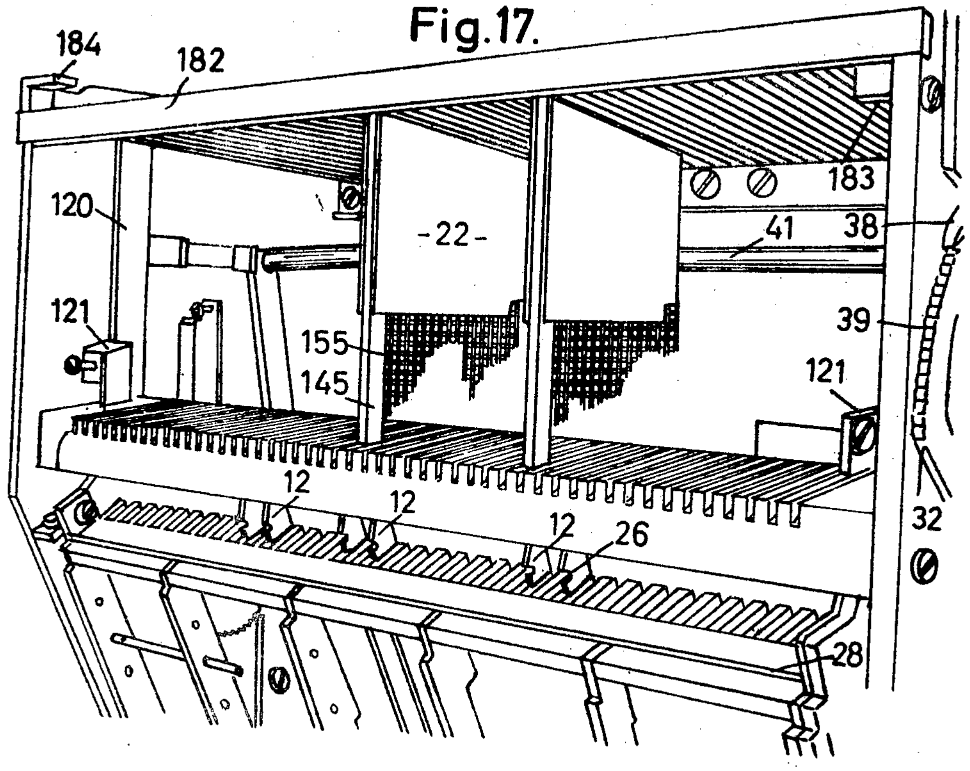

FIG. 17 shows graphically a top view of the number store with two cipher magazines.

Figure 18:
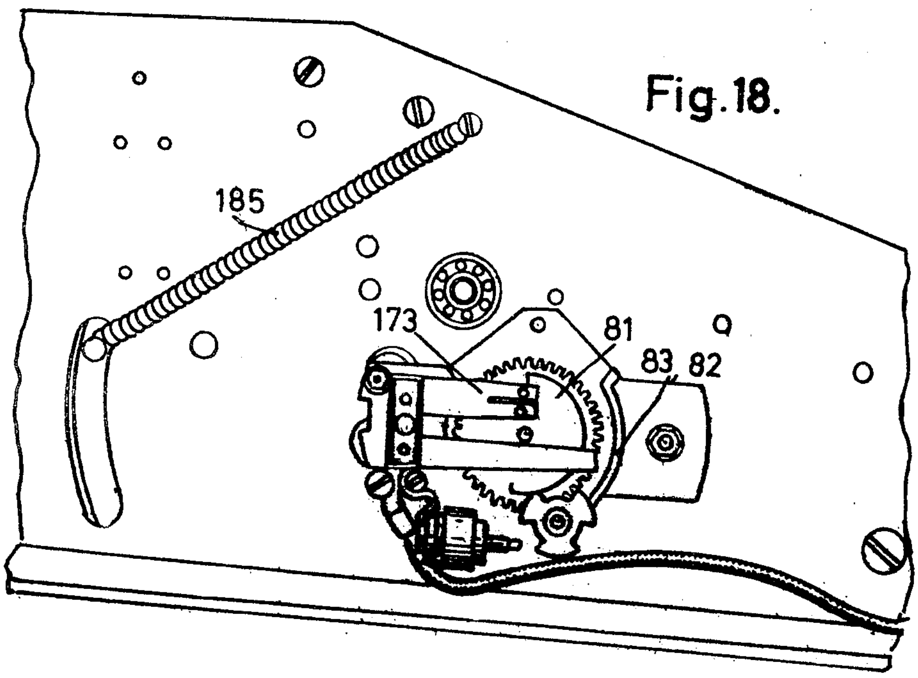

FIG. 18 is a side view from the left on FIG. 15.

Figure 19:
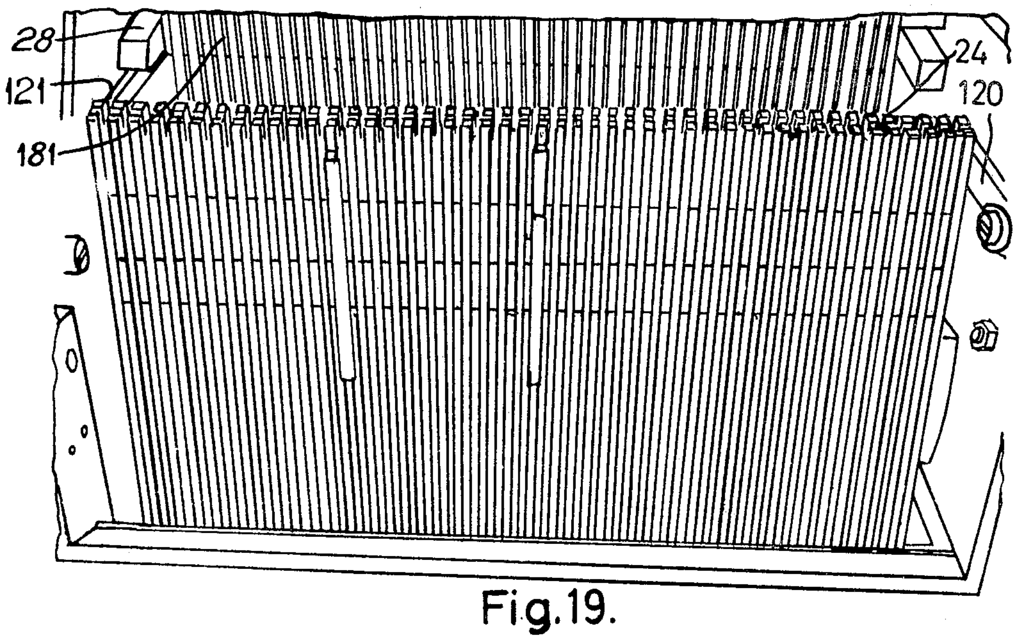

FIG. 19 is a rear view of the device.

Figure 20:
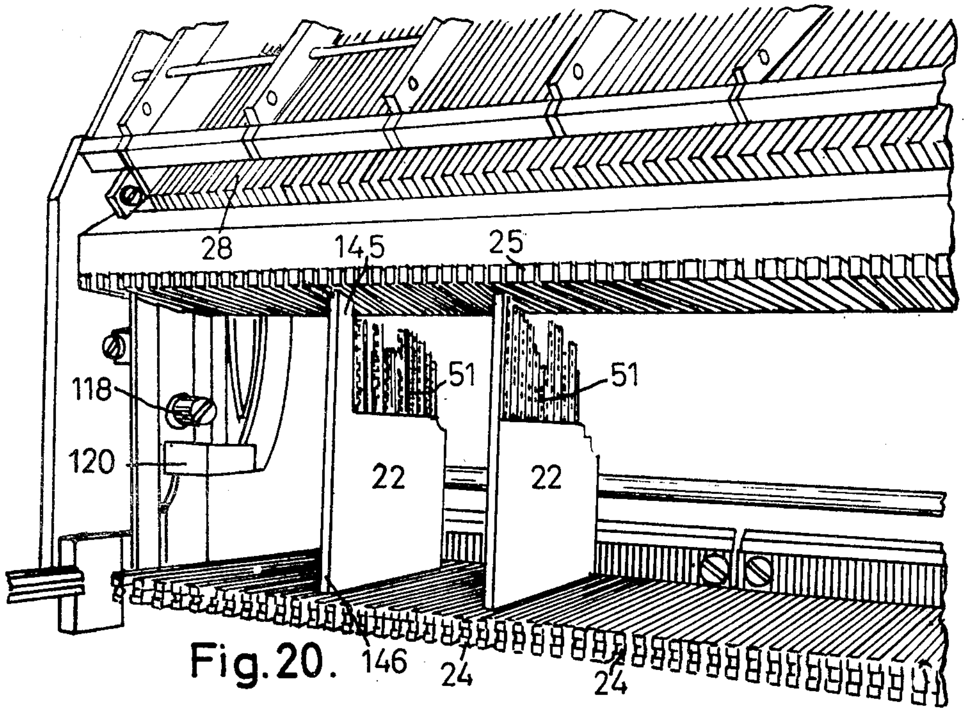

FIG. 20 is a view corresponding to FIG. 17 but with the holding bar for the cipher magazine raised.

Figure 21:
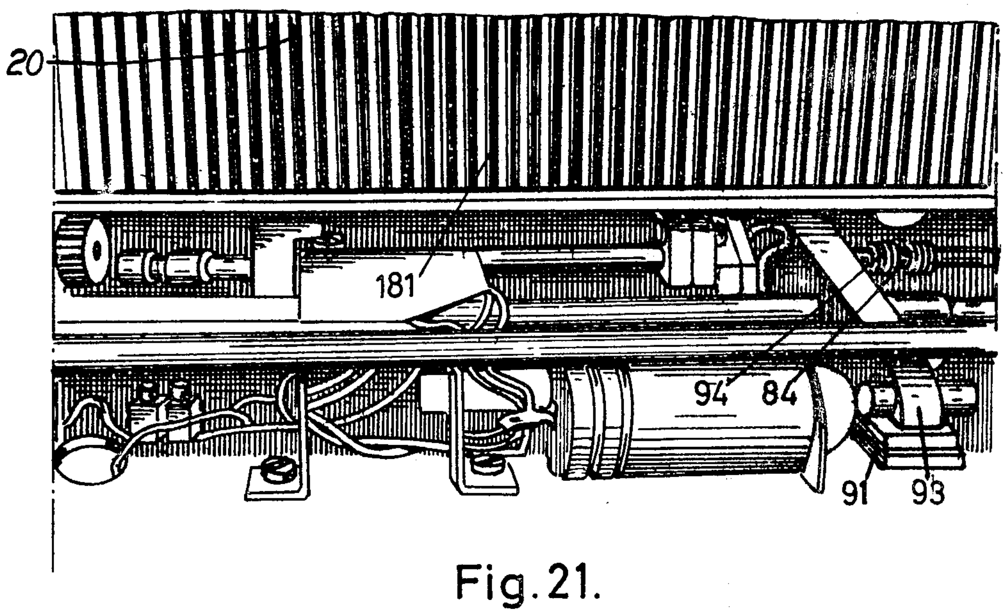

FIG. 21 is a view looking on the guide grooves with the holding noses of the control bars which are located between the guide grooves.

Figure 22:
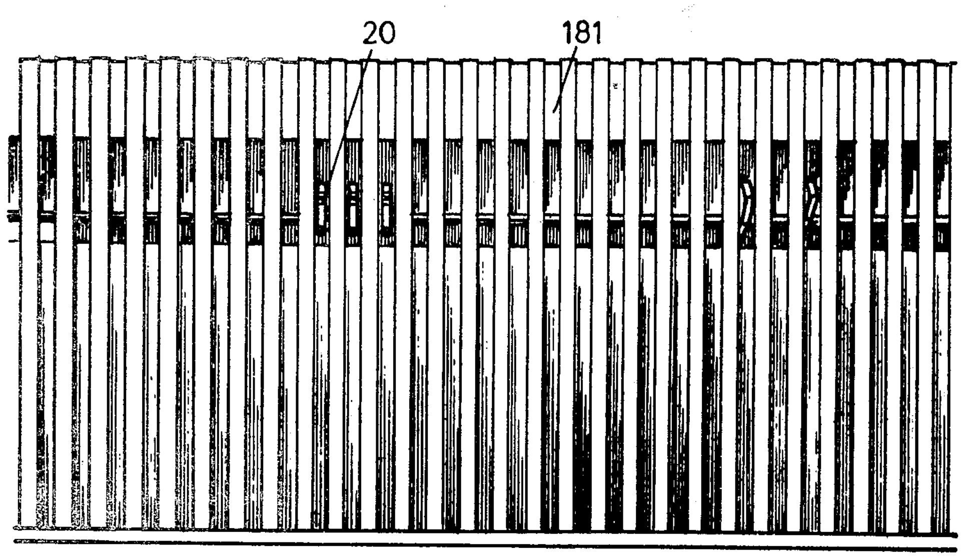

FIG. 22 shows details of FIG. 21 to enlarged scale.

Figure 23:
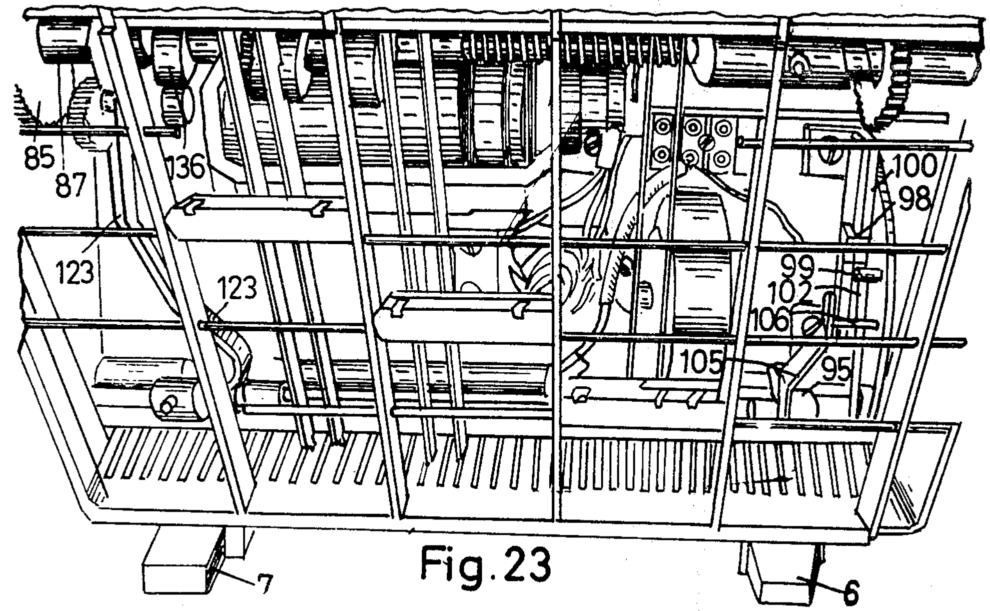

FIG. 23 shows the reversing clutches and also the key field and the rapid- and intermediate-stop keys of the device.

Figure 24:
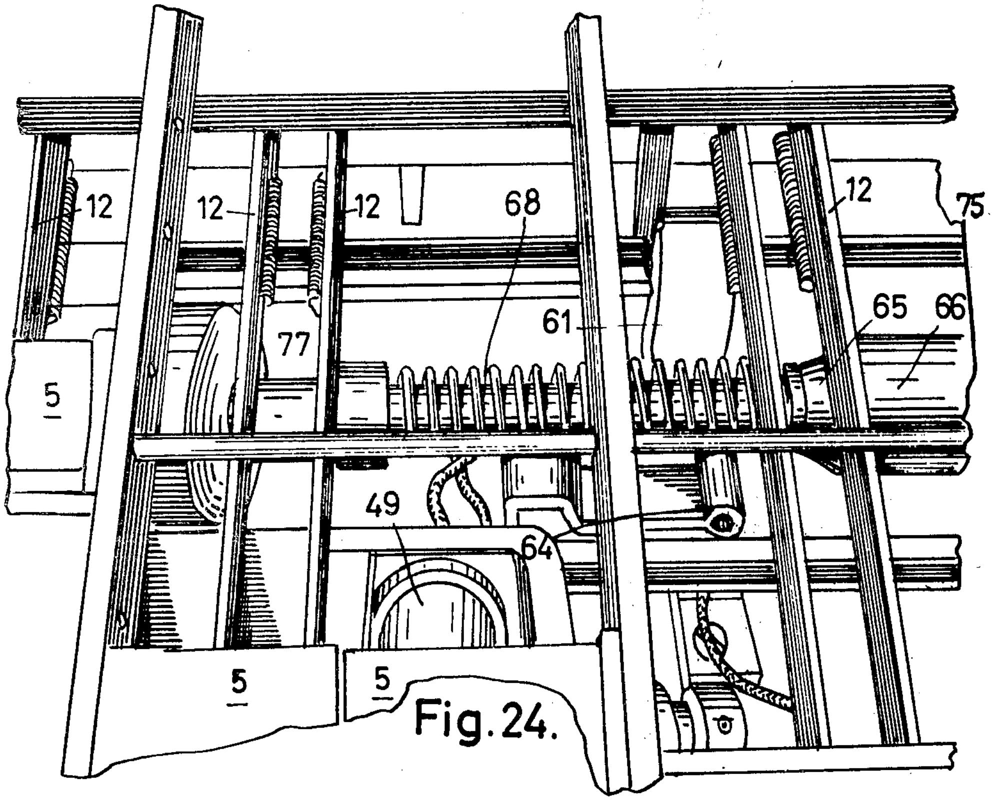

FIG. 24 shows to enlarged scale a detail of FIG. 23.

Figure 25:
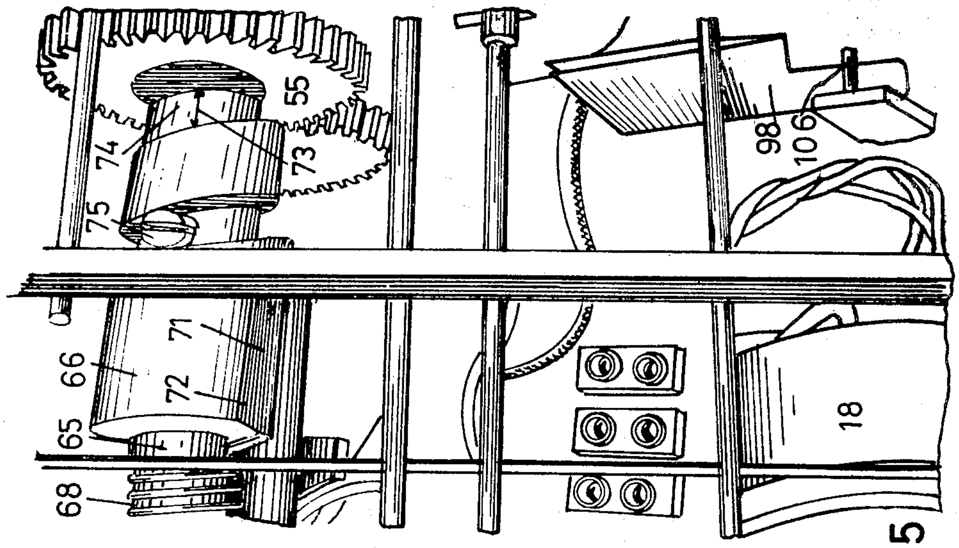

FIG. 25 shows to enlarged scale a detail of FIG. 23.

Figure 26:
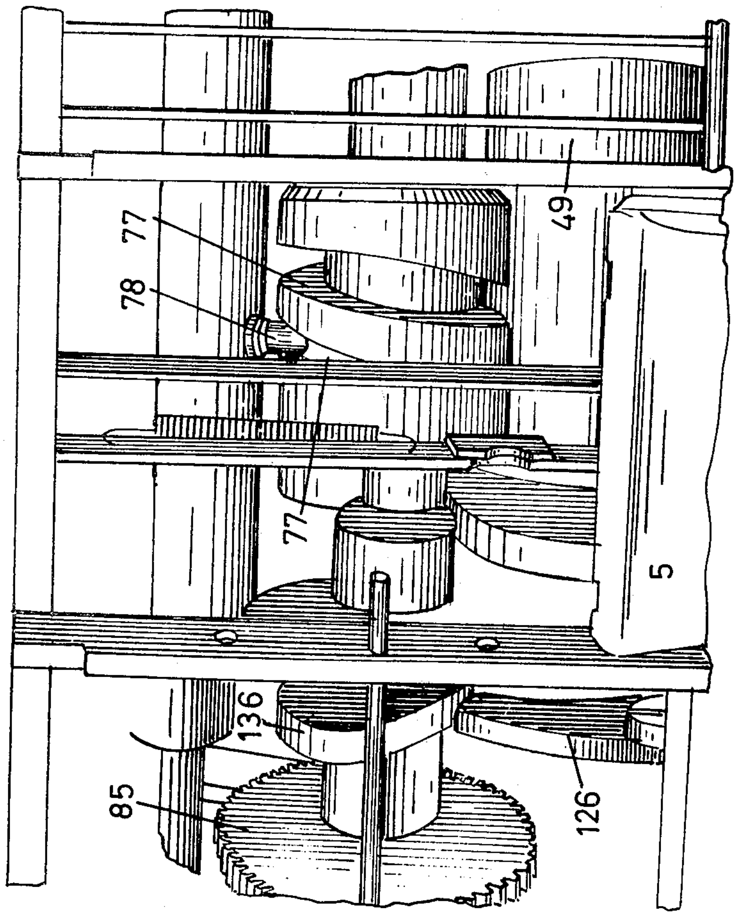

FIG. 26 shows to enlarged scale a detail of FIG. 23.

Figure 27:
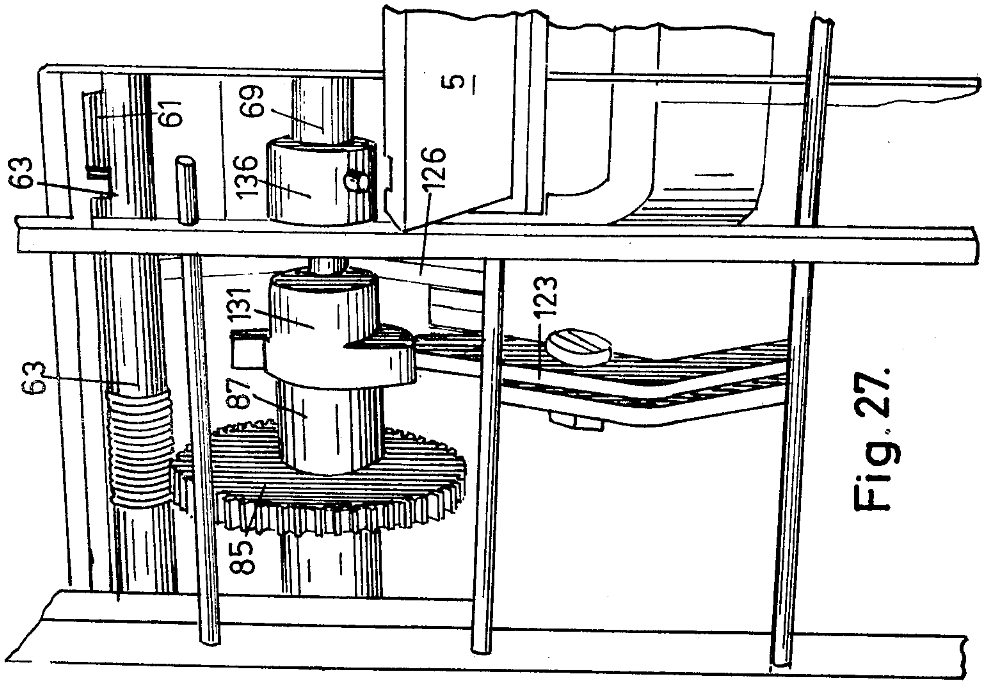

FIG. 27 shows to enlarged scale a detail of FIG. 23.

Figures 28, 29:
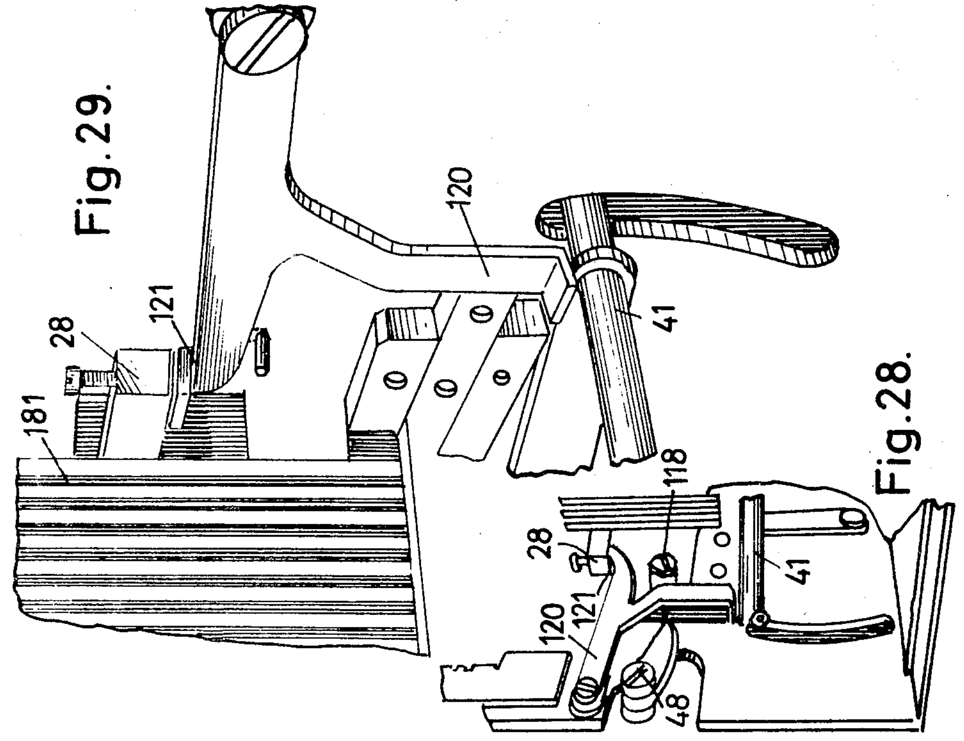

FIG. 28 shows to enlarged scale a detail of FIG. 20.

FIG. 29 shows to enlarged scale a detail of FIG. 19.

Figure 1:
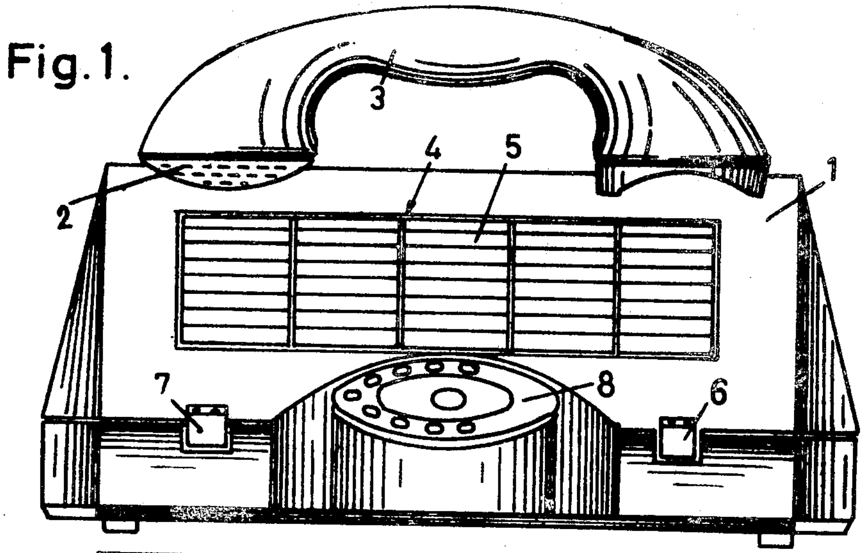
Figure 2:
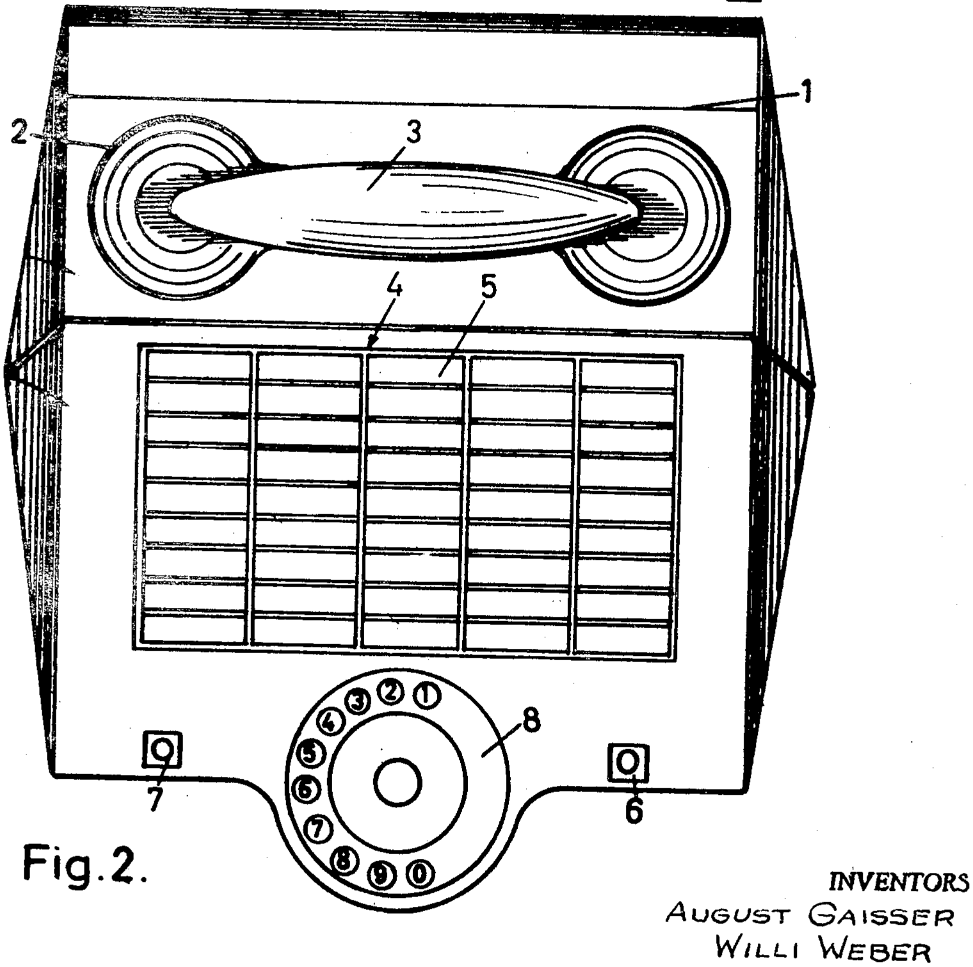
FIG. 2 is a plan view of FIG. 1.

In FIGS. 1 and 2 is shown the casing of the device; on the upper side recesses 2 are provided in which the hand instrument 3 rests. On the front of the casing is a key field 4, separate keys 5 of which serve for the selection of subscriber numbers with which these keys are associated. The intermediate stop key 6 is operated if after a definite succession of numbers, for instance the first group number of a subscriber, the impulse transmitter stops without the connection to the telephone network being interrupted. By pressing this key 6 the selecting operation is continued. If for example immedately following the first group number the busy signal is sounded, then by pressing the rapid-stop key 7 the device rapidly reassumes its initial position. The connection with the telephone or telewriter network is not interrupted but the current impulses are prevented from being transmitted by the impulse transmitter into the conducting network. If numbers are chosen which are not on the key field 4 then a counting dial 8 is used which corresponds to the numbering dial of the normal telephone instrument. By "numbering dial" is to be understood the connection of the counting dial with the impulse transmitter and the winding spring while the counting dial is only a disc with holes over numbers which then if desired is in operative connection with an impulse transmitter.

Figure 3:
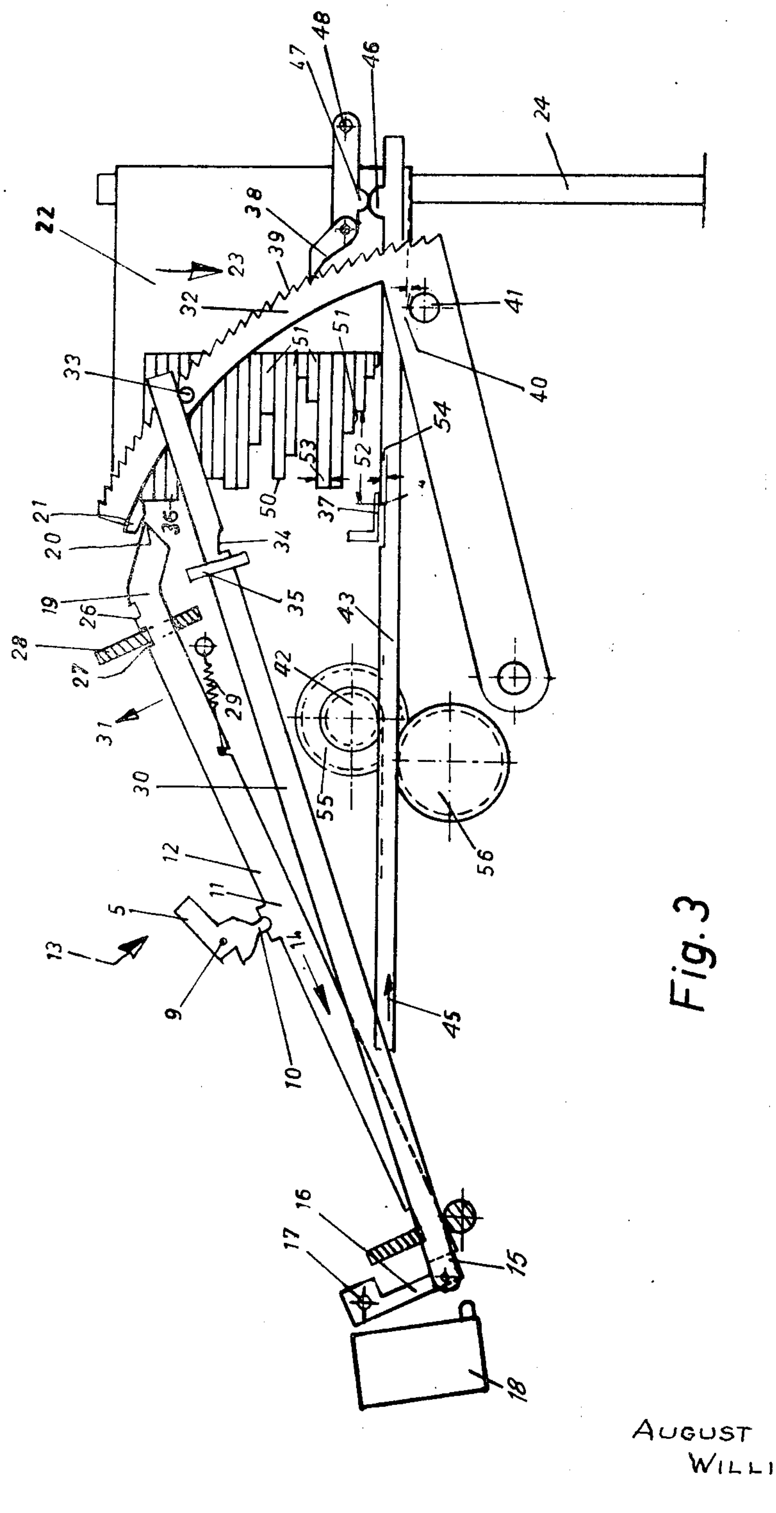
FIG. 3 shows diagrammatically a scheme of operation for the scanning of a cipher magazine the projections of which are formed by cipher pins.

In FIG. 3 it will be seen that the key 5 pivots about an axis 9 and with its lug 10 engages in a recess 11 in the control bar 12. If the key 5 is moved in the direction of the arrow 13 the control bar 12 is moved in the direction of the arrow 14. One end 15 of the control bar is connected wtih the switch bar 16 which turns above the axis 17 and on movement in the direction of arrow 14 actuates the delay switch 18. The switch has a delay of about one second; this period is required to allow the cipher magazine to move from its inoperative position into the starting position. On movement in the direction of the arrow 14 the nose 20 located at the other end 19 of the control bar is moved sufficiently away from the holding nose 21 of the cipher magazine 22 that the latter drops under the force of gravity in the direction of the arrow 23. It is guided in guide bars 24 on one side and in guide grooves 25 (FIG. 20) which will be described later.

FIG. 3 moreover shows that the control bar 2 has two grooves 26, 27 into which a locking bar 29 drops in order to hold the control bar either in the inoperative position which it assumes after pressing the key 5. The control bar in its working position is tensioned by the spring 29. By movement of the lug 10 in the direction of the arrow 14 the locking bar 30 connected with the control bar is also moved. This locking bar moves inter alia locking bar 28 in the direction of the arrow 31. The locking bar 30 also locks the switch 18 or prevents the switch bar 16 from releasing the switch 18 before completion of the selecting operation or before the inoperative position is reached. On movement in the direction of the arrow 14 and after the toothed segment has dropped, the locking bar 30, after the supporting pin 33 has moved away with the toothed segment 32, can engage with its notch 34 behind the locking member 35 secured to the casing and thus ensure that it canont move opposite to the direction of the arrow 14.

The movement of the cipher magazine 22 in the direction of the arrow 23 is limited by the abutment of the stop pin 35 on the stop bar 37. In a manner which will be later described, by movement of the key 5 the feed pawl 38 has also been released from the teeth 39 of the toothed segment 32. In the inoperative position shown, a gap 40 is provided between the upper edge of the support 41 which is connected with the toothed segment 32. This is so that this support 41 is relieved of the weight of the cipher magazines 22 which in their entirety constitute the number store. Each control bar 12 bears on its nose 20 the cipher magazine associated therewith. By thus relieving the weight on the support 41, which later by means of the feed pawl 38 again transports the cipher magazine opposite to the direction of the arrow 23 into the inoperative position, it is possible for the feed pawl 38 to be easily removed from the teeth 29. In a manner that will be described later the driving motor is switched on by the switch 18 which finally rotates through friction wheels toothed wheel 42 which moves the rack bar 43 guided in guides with the scanning bar 44 acting as a scanning member in the direction of the arrow 45. Actuating cams 46, 47 on the rack bar and on the feed pawl, in conjunction with a locking pawl which will be later referred to, causes the feed pawl 38 to turn above its axis 48. Further, on every to and fro movement of the rack bar 43, the toothed segment 32 moves upwards in the direction of the arrow 23 together with the support 41 as a result of which the cipher magazine 22 is also again moved upwards.

Figure 5:
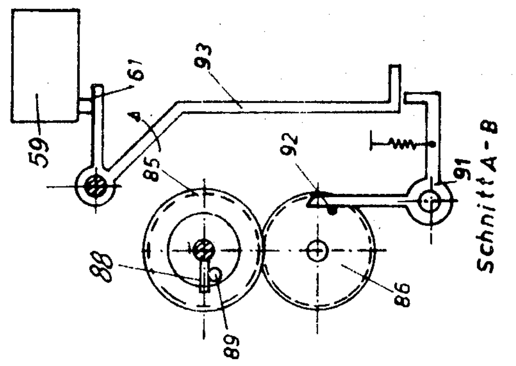
FIG. 5 shows diagrammatically a detail of FIG. 4.
Figure 4:
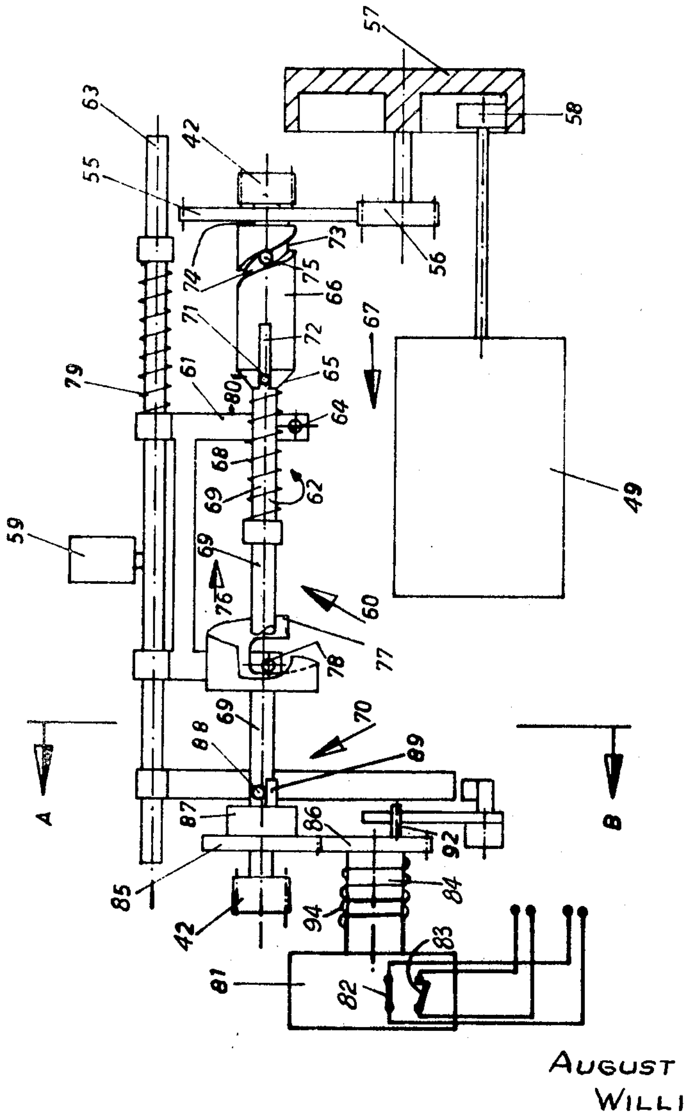
FIG. 4 shows diagrammatically a scheme of operation for the reversal of the direction of rotation of the driving motor, and the drive for the impulse transmitter.

FIGS. 4 and 5 show the reversal of the direction of rotation of the driving motor 49 which must take place when the forward end of the scanning bar 44 strikes one of the projections 50. These projections are provided at the forward end on the cipher pins 51. The distance 52 from the forward edge of the scanning bar 44 to the projection 51 is a measure of the length of the winding movement and the number of the current impulses which are transmitted. Short distances correspond for example to the numeral 9 and large distances to the numerals 0, 1 and so on. The height 53 of the cipher pins must be greater than the height 54 of the scanning bar. Each cipher pin 51 corresponds to a different number.

From FIGS. 4 and 5 it will be seen that the toothed wheel 42 is connected with a pinion 55 which in turn meshes with the pinion 56. The connection to the driving motor 49 is provided by way of a friction wheel drive 57, 58. The driving motor changes its direction of rotation and therewith the rack bar 43 is also moved opposite to the direction of the arrow 45 when the reversing switch 59 is actuated. The reversing switch clutch 60 operates in the following manner:

The switch rocker 61 actuates the electrical reversing switch 59 when it is moved in the direction of the arrow 62 about the axis 63. This movement is produced by the switch pin 64 which is arranged on the switch rocker 61 and is moved downwards at right angles to the plane of the paper by the switch cam 65 on the running sleeve 66 when this switch cam 65 contacts the switch pin 64. The movement of the sleeve 66 in the direction of the arrow 67 against the action of the spring 68 is completed when the toothed wheel 42 stops due to the striking of the scanning bar 42 on any projection 50. The toothed wheel 42 is fast on the shaft 69 which winds up the number switch 70. The driving pin 71 is secured to this shaft 69 and engages in the slot 72 in the sleeve 66. The sleeve 66 has a switch cam 73 and is mounted on the hollow shaft 74 which in turn is secured to the pinion 55. The connection between this hollow shaft 74 and the sleeve 66 is provided by a driving pin 75. The mode of operation is then as follows:

When the rack bar 43 strikes the scanning bar 44 and the toothed wheel 42 stops, the still running driving motor 49 drives the pinion 55 through the pinion 56. The hollow shaft 74 is thus rotated and the sleeve 66 which is pressed by the spring 68 in the direction contrary to the arrow 67 is now moved by the driving pin 75 in the direction of the arrow 67. The shaft 69 remains stationary since the pin 71 can slide in the slot 72. This slot 72 must at least be long enough that the switch cam 65 actuates the switch rocker 61 by pressing on the pin 64 and thus the electrical reversing switch 59 before this pin 71 has reached the end of the slot 72. The direction of rotation is then reversed and the sleeve 66 is then pressed by the spring 68 back into its initial position.

By means of the switch cam 73 a continuing movement is imparted to the switch cam 65 until it meets the switch pin 64. If, for example the ciphers 1 which require only a very small movement of the scanning bar are to be scanned following one another then this large movement of the switch cam 65 is disturbing as this movement is at least so great that two 0's in succession which require a long scanning path can be switched with reference to the reversal of direction.

In order in the small scanning movements to shorten the switching movement of the switch cam 65, in accordance with this invention the switch pin 64, i.e. the switch rocker 61, is also moved but in the direction of the arrow 76 towards the switch cam 65 even if the switch cam 65 has not yet moved, i.e. the pinion 42 and therewith the rack bar 43 has not yet come to a standstill. The said operation is obtained by arranging on the shaft 69 a transport cam 77. In this transport cam engages the transport pin 78 connected with the switch rocker. The position of the transport cam is so selected that on the movement of the scanning bar 44 toward the projections 50 the transport pin 78 and therewith the switch rocker 61 are moved in the direction of the arrow against the action of the spring 79. The distance 80 between switch cam 65 or 73 and the switch pin 64 can be arranged by suitably dimensioning or inclining the transport cam 77 so that reversal takes place even after a very small rotary movement of the hollow shaft 74. The functional cooperation of those parts is illustrated graphically in FIGS. 15, 23, 24, 25 and 26.

The left hand side of FIG. 4 shows also the impulse transmitter 81, the contacts 82, 83 of which in known manner transmit series of impulses into the telephone or telewriter network. This impulse transmitter which in the normal instrument is wound up manually and movement of a counting dial is, in the present instance, wound up by the shaft 84. On this shaft is provided the winding spring. The winding pinion 86 meshes with the pinion 85 which is located on the hollow shaft 87. The pinion 86 or the hollow shaft carries this winding pin 89 which is located in the region of the transmission pin 88. This transmission pin 88 is fixed on the shaft 69 so that the movement of this shaft 69 which at both ends moves the rack bars 43 by means of the toothed wheels 42 at the same time according to the angle of rotation of this shaft 69 moves the winding spring on the shaft 84. If the shaft 69 remains stationary because the scanning bar 44 abuts against a projection 50 then the stressed winding spring starts the impulse transmitter 81 which is shown in FIG. 18.

In the last part of the return movement of the rack bar 43 the feed pawl 38 is moved upwards by the actuating cams 46, 47 and thus through the toothed segment 32 or the support 41 raises the cipher magazine 22 one division higher. Moreover during the return of the rack bar the switch rocker 61 is locked by the locking rocker 91 until the locking pin 92 on pinion 85 again releases this locking action so that the reversing switch 59 can again reverse the direction of rotation of the driving motor 49.

In FIG. 21 is shown a lever 93 mounted on the switch rocker 61 which lever cooperates with the locking rocker 91. In the position shown the switch rocker 61 is locked. If the lever 93 is moved out of the plane of the paper then it engages behind the stop and frees the switch rocker. In FIG. 21 is also shown a winding spring 94 which is arranged on the winding shaft 84. The shaft 69 is moved when the driving member 75 reaches the left hand end (FIG. 4) of the switch cam 73 and the sleeve 66 then by means of the slot 72 and the pin 71 moves the shaft 69 and therewith the toothed wheels 42.

Figure 6:
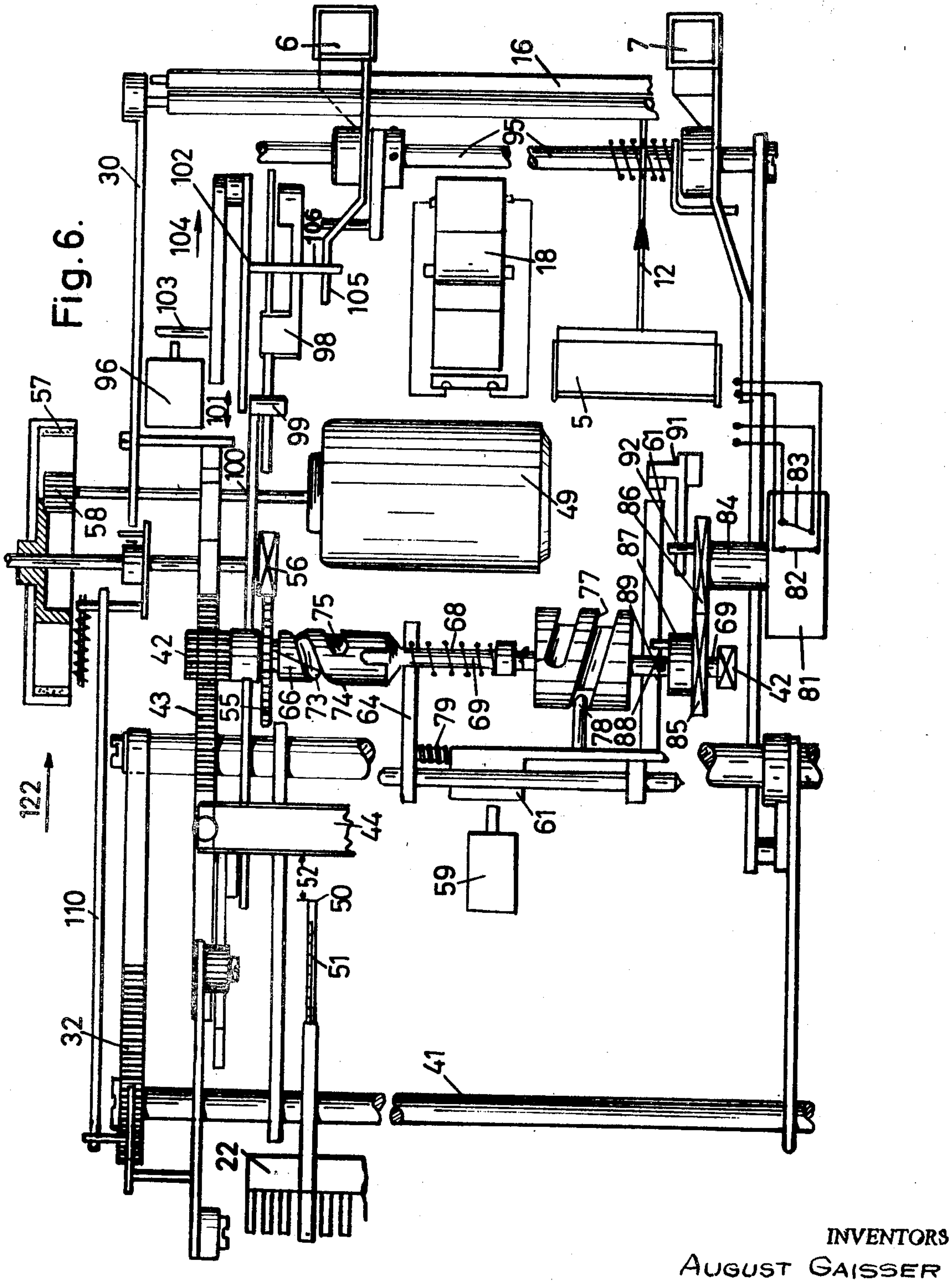
FIG. 6 shows diagrammatically the functional scheme of the whole selecting process.

In FIG. 6 the same numerals indicate like parts. It will be observed that the intermediate stop and rapid stop keys act on the same switch shaft 95 and that a motor switch 96 is provided in series with the delay switch 18, which opens when the distance 52 between the projection 50 on a figure pin and the scanning bar 44 is so small that the guide member 99 cannot move around the back of the can 98. The guide member 99 is secured at the one end of the bar 100 the other end of which is connected with the rack bar 44. The bar 100 and the guide member 99 are moved to and fro in the direction of the arrow 101. When the guide member 99 strikes the stop lever 102 the switch shifter 103 is moved therewith in the direction of the arrow 104 until the switch 96 opens. By stopping the driving motor the selecting operation is therewith interrupted. By pressing on the intermediate stop-key 6 after rotation of the switch shaft by the lever 105 and the lever 106 secured to the stop lever 102 the switch shifter 103 is moved contrary to the direction of the arrow 104 and the selecting operation continues. These levers are shown graphically in FIGS. 15, 16 and 23. The stoppage of the motor by the switch 96 can also be withdrawn by pressing the rapid stop key 7 which also acts on the shaft 95.

Figures 7, 8:
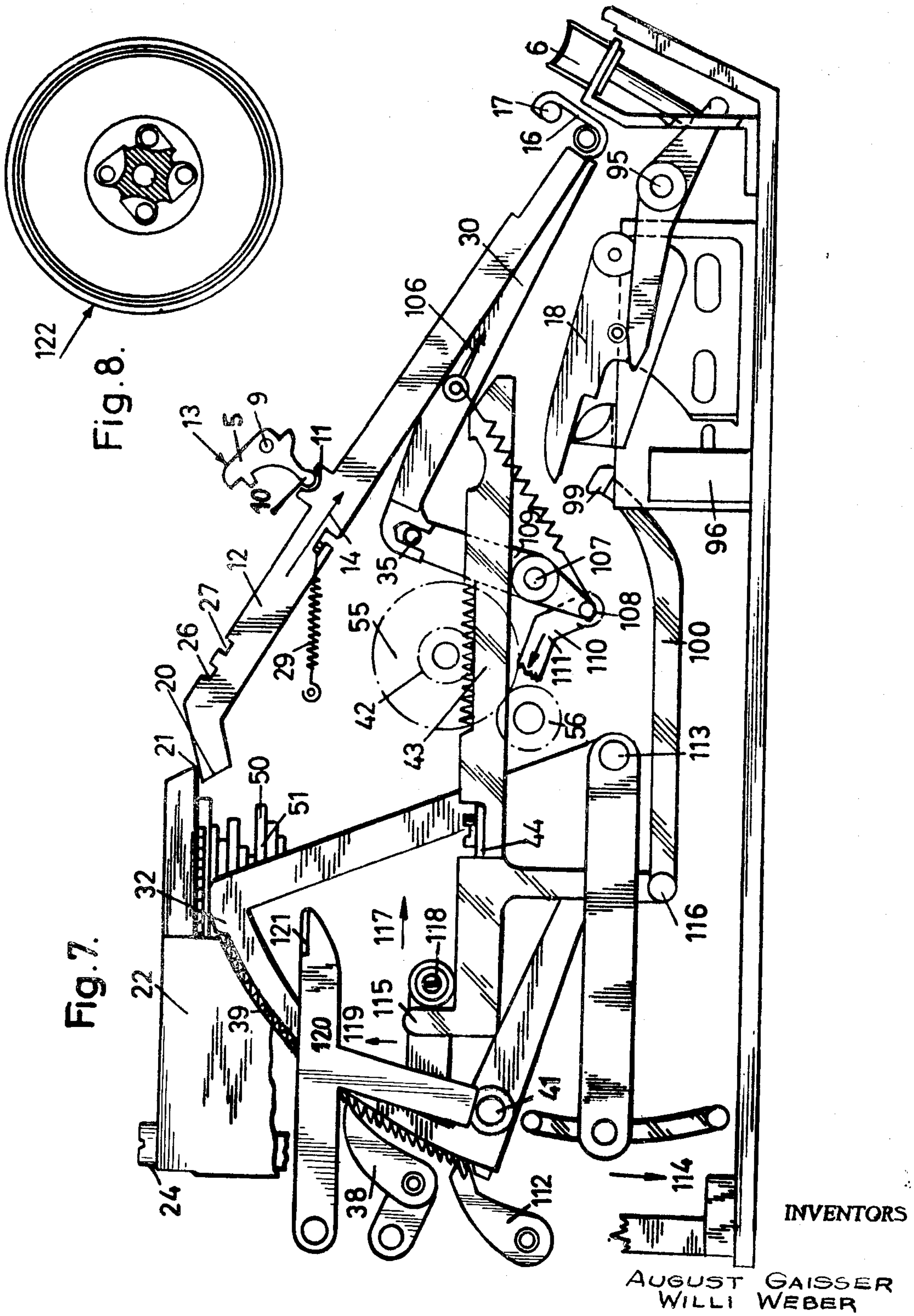
FIG. 7 shows diagrammatically the operating scheme, with an intermediate stop by pressing the intermediate stop-key.
FIG. 8 shows diagrammatically the clutch for the drive.

In FIG. 7 the same numerals also indicate like parts. This figure again makes clear the operation of the intermediate stop-key and shows the feed pawl mechanism which operates independently of the to and fro movement of the rack bar. It will also be clear that the locking of the switch bar 16 is effected by the locking bar 30 at the locking member 35. If the locking bar is moved in the direction of the arrow 106 then through the levers 109, 110 which can turn about the pivots 107 and 108 in the direction of the arrow 111 the lever 110 will press the feed pawl 38 and locking pawl 112 out of engagement with the teeth 39 of the toothed segment 32. The toothed segment then drops, turning about the pivot 113 in the direction of the arrow 114. With the rack bar 43 is also connected the feed cam 115 to which the bar 100 with the guide member 99 is connected by the pivot 116. If the feed cam is moved in the direction of the arrow 117 the switch roller 118 is moved in the direction of the arrow 119. The feed pawl 38 consequently moves the toothed segment 32 upwards through one division. The locking pawl 112 then engages. After reversal of the direction of rotation and the direction of movement of the rack bar 43 the switch roller 118 again drops downwards and the operation begins again.

Before the toothed segment 32 reaches its inoperative position i.e. has been turned upwards, it carries with it shortly before reaching the inoperative position the stop bar 120 which in turn with the stop 121 raises the locking bar 28 so high that the control bar 12 can slide thereunder until the locking bar drops into one of the grooves 26 or 27. These parts are shown graphically in FIGS. 16, 17, 19, 20, 28 and 29.

FIG. 8 shows a slip clutch 122 which is located between the friction wheel drive 57, 58 or between the driving motor 49 and the pinion 56. It is necessary when the shaft 61 stops but the direction of rotation of the motor has not yet been reversed.

Figure 9:
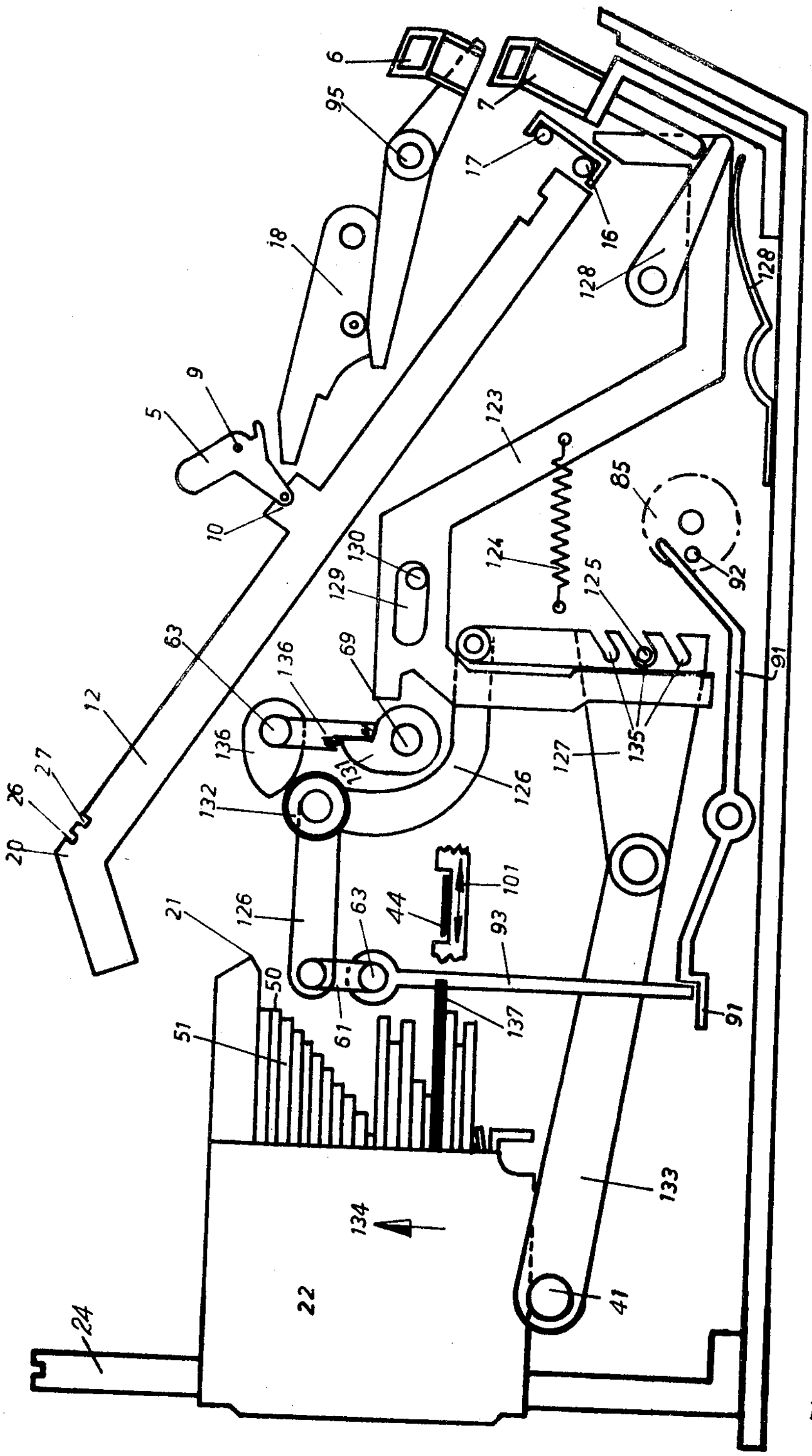
FIG. 9 shows the operating scheme diagrammatically using a so-called rapid stop.

FIG. 9 illustrates the operation of the rapid stop-key 7. By pressing the key 5 the normal selecting operation is released and the control bar 12 pressed forward. The lever 123 is positively moved therewith and the spring 124 tensioned. By the movement of the lever 123 the rapid switch pin 125 of the rapid switch lever 126 is released from the rapid switch segment 127 and brought into the idle position. The rapid stop release is effected by pressure on the rapid stop key 7, the holding device 128 is thereby moved downwards with the lever 123 against the action of the spring 129 and thereby releases the lever 123. By the tension of spring 124 the lever 123 is moved rearwards until the end of the long slot 129 abuts on the holding pin 130. The rapid switch pin 125 thus enters one of the notches in the rapid switch segment 127. The switch movement itself is effected by a switch cam 131 secured on the shaft 69. This cam movement on the roller 132 of the rapid switch lever 126 is transmitted to the rapid switch segment 127 which moves downwards by the amount of one notch. By the lever 133 this switching movement is transmitted to the toothed segment 32 or the support 41 and the cipher magazine 22 is raised in the direction of the arrow 134. The total amount of three steps corresponding to the three notches 135 in the rapid switch segment 127 quickly raises the magazine in seconds into the inoperative position at the same time switches off the instrument. The instrument is then free for a further selecting operation. The total operation requires limitation of the movement of the scanning bar 44 in the direction of the arrow 101. The reversal of the direction of rotation of the driving motor must be effected before contact of the scanning bar 44 on the furthest projecting cipher pin 51. The reversal can only take place externally of the range of the cipher pin and impulse transmission must not take place during this accelerated movement into the inoperative position of the cipher magazine 22. Both necessary steps are obtained in the following manner: By release of the lever 123 the switch cam 131 is rotated until it meets the stop 136. The rise of the scanning bar 44 is thereby limited and at the same time impulse transmission is prevented.

If the instrument is stopped within its selecting period by intermediate stop i.e. by the intermediate stop pin 137 which is nearest the scanning bar 44 then by pressure on the rapid stop-key 7 the intermediate stoppage can be removed. Accordingly three operations dependent on one another are possible, (a) pressure on the key 5, normal selecting operation, (b) pressure on the key 6, removal of the intermediate stop after the scanning bar 44 has contacted the intermediate stop cipher pin 137, (c) by pressure on the rapid stop-key 7 cancellation of the operations (a) and (b) is obtained and the cipher magazine 22 moved in a rapid movement into its inoperative position.

The said parts are shown graphically in the following figures: FIGS. 15, 23, 26 and 27.

FIGS. 10 and 11 show in place of the use of a cipher magazine with cipher pins a cipher magazine 135 having teeth 139. In these figures the same numerals indicate like parts.

In FIG. 10 the cipher magazine 138 is shown in its scanning position i.e. operating position, resting with a recess on the stop bar 37. In order to make the drawing clearer the rack bar 43 with the scanning bar 44 is shown lower down. Switching by the delay switch 18 and by the reversing switch 59 is effected exactly in the same manner as in the preceding figures. The cipher magazine 138 turns above the pivot axis 140, the toothed segment 32 is pivoted about the axis 141, the support 41 is thereby forced upwards in the direction of the arrow 142. If then the cipher magazine 138 shown in FIG. 11 assumes the position shown in FIG. 10 it will be understood that the scanning bar 44 is located in the range of the teeth 139. Exchange of this cipher magazine is effected by withdrawing it in the direction of the arrow 143.

FIG. 12 shows the cipher magazine with cipher pins as used on the device shown in the other figures except FIGS. 10 and 11. The cipher magazine 22 has a casing 144 of rectangular cross section. With the casing is firmly connected the holding nose 21 which is arranged at the end of the holding bar 145 secured to the casing. The casing itself is of rectangular cross section as the figures show, FIG. 12*a* showing a plan view of the casing stacked with cipher pins. FIG. 12*b* is a cross section through the casing showing the holding nose. FIG. 12*c* is a face view of FIG. 12*a* and FIG. 12*d* shows one cipher pin of FIG. 12*a* to enlarged scale.

The casing has a rectangular opening 146 extending therethrough which receives the guide bars 24. On the side opposite this rectangular opening is provided an angled surface 147 which serves the cipher pin guide. This angled surface extends from the holding nose 21 or the holding bar 145 so far that only the length 148 of the total rectangular cross section 149 remains free. The length 148 is somewhat greater than the height 53 of the cipher pin 51. The cipher pins are then so introduced that at right angles to the plane of the drawing of FIG. 12*c*, the cipher pin shown in FIG. 12*d* is turned upwards out of the plane of the drawing through 90° and then led downwards to the desired length 150 at right angles to the plane of the drawing in order to be guided in the direction of the arrow 151 to the holding bar. The other cipher pins are similarly inserted. The length 150 decides the number which is to be selected. A preferred arrangement is that the notch 152 gives the cipher pin the greatest length 150. The cipher magazine thus drops down to this pin on the supporting bar 41 or support 41. The projections 50 are then scanned by the scanning bar 54. The next notch 153 shortens the length 150 of the inserted cipher pin. This shortened length is provided for the intermediate stop or rapid stop. The next notch 154 serves in the scanning operation to provide an extended pause, for example in moving from a first selecting number to the subscriber's number without an intermediate halt. The other notches 155 serve for the special cipher selection of the subscriber's number, the first notch 155 nearest the notch 154 permitting the selection of the cipher 1 and the last notch the selection of the cipher 0. In between are disposed the ciphers 2 to 9. The cipher magazine can be fitted with twenty cipher pins. Each cipher pin has thirteen notches. The cipher pin which effects the stop at the same time marks the start of the numbers to be stored. Easy setting of the numbers is obtained by using a special gauge. By insertion in this gauge the cipher pins are pushed out to the desired length 150. In this position the cipher pin is inserted in the cipher magazine 22. When the cipher magazine is filled then just like the cipher pins a tension spring 156 is inserted which presses the cipher pins against the holding bar 145 and thus prevents them from changing their length 150.

It will be obvious that the scanning can be effected, for instance, photomechanically by light, the cipher pins then more or less covering a photo cell, which naturally formed with spaces, replaces the scanning bar.

FIG. 13 serves for the electrical explanation of the operation. By pressure on the key 5 the delay switch 18 is actuated through the control bar 12 and the switch bar 16. Contacts 157, 158 close after about a second. The connection to the electrical reversing switch 59 is established by way of the motor switch 96 and contacts 159 and 160. The reversing switch 59 and contacts 161, 162 or 161, 163 produces a forward or reverse rotation of the motor 49 by way of the starting condenser 164. The motor switch 96 interrupts the circuit with rapid stop by pressing the key 7 or on intermediate stop by the movement of the switch slide 103. On actuating the key 6 the "ready" light 165 lights up. Through the wiping contact 166, 167 which is actuated by the delay switch 18 the current control relay 168 is brought into the circuit it is held by means of its contacts 169, 170. In this case the contacts 171, 172 short circuit the current impulses of the contacts 82, which are actuated by the impulse transmitter. Only on a new subscriber selection are these contacts again released. The motor 49 drives the pinions 56, 55 through the friction wheels 57, 58. The impulse transmitter is actuated by the shaft 69 which is driven by the pinion 55. The contact 173 is the contact of the fork reversing switch which is actuated by the hand instrument or its weight.

FIG. 14 shows the circuit diagram. The right hand part of the figure indicates by the same reference numbers the like contacts and the like parts. The device is connected with the hand instrument 3 by way of a four core conductor 174 and the terminal bar 175. It will be seen that the number dial 176 which is manually operated by means of suitable switching can itself transmit current impulses into the telephone or telewriter network with the conducting lines 177 and 178. The connection to the telephone or telewriter network is effected by way of the ordinary three cored conductor 179. The network potential is connected to the terminals 180.

The cipher magazines are guided, as FIG. 15 shows, with their holding noses in guide grooves 181. The cipher magazines and their guides are also shown in FIGS. 15, 17, 19, 20, 21, 22 and 29. FIGS. 17 and 19 also show that the cipher magazines 22 are held in or freed from their guides by turning up or down the holding bar 182 which turns about the bearing 183 and is connected with the casing by the bolt 184.

In the preceding description operation of various parts such as switch stop, intermediate stop, rapid stop, scanning and so on have been described. Now the operation of the device without an intermediate stop and a rapid stop will be described.

By pressure on the key 5 which rotates above its pivot 9 the control bar 12 is moved against the action of the tension spring 29. The locking of the cipher magazine 22 at the holding nose 21 is thereby released. Moreover the engagement of the feed pawl 38 with the toothed segment 32 is released by a separate device previously described and the cipher magazine 22 which rests on the support 41 of the toothed segment 32 can drop in its guide bar 24 until the stop pin 36 (see the foregoing description of the cipher magazine) strikes the support 41. At the same time by the movement of the control bar 12 the switch bar 16 is moved above its pivot and actuates the delay switch 18 which after a delay of about one second starts the driving motor 49.

The locking of the switch bar 16 is effected by engagement of the locking bar 30 with the locking member 35. The control bar 12 is moved back into the inoperative position after being switched on. After the expiration of a delay of about one second the delay switch 18 closes and the driving motor 49 starts.

The pinions 56, 55 are driven by means of the friction wheel drive 57, 58. The pinion 55 has a hollow shaft 74 on which a driving pin 75 is so mounted that it travels in the switch cam 73 of the sleeve 66. This sleeve 66 is pressed by the pressure of the spring 68 towards the pinion 55. The pinion 55 rotates and takes with it the shaft 69 with the pinion 42. The rack bar 43 with the scanning bar 44 is thereby moved in the direction of the arrow until the scanning bar 44 strikes the cipher pin 51. Also the reversing switch 59 is moved by the transport cam 77 by means of the transport pin 78 on the axis 63 against the action of the spring 79. On contact of the scanning bar 44 with a cipher pin 51 the scanning bar 44 can no longer move in the direction of the arrow and thus by the driving pin 75 on the hollow shaft 69 the sleeve 66 is moved against the action of the spring 65 until the switch pin 64 of the reversing rocker 61 meets the switch cam 66, moves the switch rocker 61 in the direction of the arrow (FIG. 5) and actuates the reversing switch 59. The direction of rotation of the motor 49 is thereby changed and the scanning operation is reversed until the rack bar 43 reaches its starting point. In the last part of the return movement the feed pawl 38 is moved upwards by the feed cam 115 on the rack bar 43 and thus through the toothed segment 32 and the support 41 raises the cipher magazine 22 further by a division.

During the scanning operation the impulse transmitter 81 is wound up through the wheel 85 and the pinion 86 and the transmission pin 88 as also the pin 89. During the return of the scanning operation the reversing switch 59 is locked by the locking rocker 91 until the locking pin 92 on the pinion 86 releases this lock and the switch 59 again changes the direction of rotation of the driving motor 49. As the impulse transmitter automatically runs down and during this time transmits impulses corresponding to the ciphers stored in the cipher magazine 22, the reversing operation is effected by the locking pin 92 only after the completion of the series of impulses. Then a new selecting and scanning operation begins. The reversing device by its construction equalizes the different scanning times between the 1 and 0 and thus ensures a uniform interval (free selection time) between separate ciphers of a selected number.

After scanning the last cipher pin 51 in the cipher magazine 22 the rack bar 43 travels back again into the starting position. The feed pawl 38 thus moves the toothed segment 32 a division further through the switch roller 118. The locking of the locking bar 30 on the locking member 35 is released by the supporting pin 33 on the toothed segment 32. The switch bar springs back and switches off the instrument. The cipher magazine 22 is held at the holding nose by the control bar 12.

Obviously all other possibilities are provided within the scope of the invention, i.e. scanning can be effected photomechanically as also the reversal of the direction of rotation. The cipher magazine may be scanned photomechanically. It is always essential that scanning of the number store formed by cipher magazines be in two planes at right angles to one another, and the scanning member which in the present instance is a scanning bar can be replaced by different other arrangements.

The winding spring 185 (FIG. 18) serves to relieve the weight on the support 41.

We claim:

1. In a device for transmitting electrical impulses in telephone or telewriting installations wherein the device has a number dial, an impulse transmitter, a number store with a plurality of cipher magazines, scanning members for the cipher magazines, and a mechanical drive which is connected through a clutch to drive a control member until the member is moved to an extent determined by the number store and thereafter release the member to permit transmission of pulses by the impulse transmitter, the improvement comprising a plurality of projections (50) on the magazines (22), the horizontal spacing (52) of which projections from the initial position of the scanning member determines the series of impulses or numbers, and the vertical spacing (53) of which projections from one another coincides with another series of impulses or other numbers.

2. In a device for transmitting electrical impulses in telephone or telewriting installations wherein the device has a number dial, an impulse transmitter, a number store with a plurality of cipher magazines, scanning members for the cipher magazines, and a mechanical drive which is connected through a clutch to drive a control member until the member is moved to an extent determined by the number store and thereafter release the member to permit transmission of pulses by the impulse transmitter, the improvement comprising a plurality of projections (50) on the magazines (22), the horizontal spacing (52) of which projections from the initial position of the scanning member determines the series of impulses or numbers, and the vertical spacing (53) of which projections from one another coincides with another series of impulses or other numbers; and means for moving the scanning member in a horizontal direction for scanning said projections (50) and for operating a feed pawl (38) to move the cipher magazines upwards by an amount which corresponds to the vertical spacing (53) between the projections.

3. A device as recited in claim 2 wherein the cipher magazines are adjacent one another and are movable vertically in guides (181, 24) which have a holding nose (21) at their upper end and cipher pins (51) thereunder, which cipher pins are movable at a right angle to the guides and form the projections (50); and wherein said scanning member includes a scanning bar (44) moved at its ends by rack bars (43) whose height (54) is less than the height of the cipher pins.

4. A device as recited in claim 3 wherein at least one cipher magazine has a rectangular cross-section (149) on its end most distant from the scanning member and a rectangular opening (146) for the guide bars, wherein a side of the scanning member has an angled surface (147) which engages grooves in the cipher pins (51), and wherein a tension spring (156) biases the cipher pins.

5. A device as recited in claim 4 wherein the mechanical drive includes a driving motor (49) and a driving pinion (55), and the rack bars moving the scanning member are connected through a toothed wheel (42) and a reversing clutch (60) for said driving motor.

6. A device as recited in claim 5 wherein the reversing clutch includes a switch rocker (61) for actuating an electrical reverser (59) which in turn has a switch pin (64) which reverses the direction of rotation of the driving pinion when the scanning member comes to rest upon contact with a projection (50).

7. A device as recited in claim 6 wherein the toothed wheel (42) is on a further shaft (69) having a driving pin (71) which engages a slot (72) in a sleeve (66), which sleeve is movable on said further shaft (69) and has a switch cam (65) which is connected by a driving pin (75) with a hollow shaft (74) mounted on said further shaft (69), and wherein said driving pinion (55) meshes with a pinion (56) of the driving motor and is carried by said hollow shaft.

8. A device as recited in claim 7 wherein the switch rocker has a transport pin (78) which engages a transport cam (77) on said further shaft (69) such that with increased driving of said further shaft the switch pin (64) is moved toward the switch cam (65) against the tension of a spring on a scanning member (44) and the reversal of the direction of rotation of said scanning member is effected independently of its length of travel immediately after the conclusion of the return movement of the impulse transmitter or number dial.

9. A device as recited in claim 8 wherein the said further shaft (69) has a winding pin (88) thereon which on rotation of said further shaft carries with it a transmission pin (89) which is connected with a winding pinion (85), and wherein said winding pinion is rotatable independently of said further shaft and meshes with a pinion (86) which winds the number dial.

10. A device as recited in claim 9 wherein the winding pinion (85) is on a hollow shaft (87) and, in the winding direction, the winding pinion is connected with the said further shaft through the winding pin (88), whereas in the return direction the winding pinion rotates independently of the said further shaft.

11. A device as recited in claim 10 wherein the winding pin is spaced apart from the transmission pin in an inoperative position of the device.

12. A device as recited in claim 11 further characterized by keys (5) which correspond to individual subscriber numbers and which engage control bars (12) to allow the cipher magazines to drop from an operative position to an inoperative position and at the same time energize the driving motor (49).

13. A device as recited in claim 12 wherein the driving motor is energized by a time-delay switch (18) whose period of delay is greater than the time the cipher magazines require to fall from an inoperative position to an operative position.

14. A device as recited in claim 12 further characterized by a friction drive between said further shaft (69) and the shaft of the driving motor (49).

15. A device as recited in claim 14 further characterized by a supporting bar (41) which extends beneath the cipher magazines which coincide with a toothed segment (32) which on movement by a pawl feed mechanism (38, 112) brings the cipher magazines to be scanned from the operative position back into the inoperative position.

16. A device as recited in claim 15 wherein when a tension spring (185) relieves the weight of the supporting bar (41), the toothed segment (32) is rotatable about a shaft which carries a rapid-return segment (127) for transporting the cipher magazines in a small number of stages from the operative position to the inoperative position.

17. A device as recited in claim 16 wherein the rapid-return segment has a few notches (135) which are covered from engagement by a rapid switch pin (125) by a lever (123) which releases the engagement by pressure on a rapid stop key (7).

18. A device as claimed in claim 16 further characterized by switch cams (131, 136) secured to said further shaft (69) which by lever connections interconnect said switch cams and the scanning member to hold the scanning member apart from said cipher pins (51) and prevent impulse transmission upon depression of the rapid stop key.

19. A device as recited in claim 18 further characterized by a bar (100) the end of which carries a guide piece (99) which is connected with the rack bar (43) moving the scanning member (44) such that independently of its travel and the distance of the projection (50) the switch (96) for the driving motor is actuated.

20. A device as recited in claim 19 wherein the guide member (99) is movable behind a cam (98) on the end of a lever on which resiliently bears a stop lever with a switch shifter, which switch shifter pivotally controls a switch shifter (103) for a switch (96) connected to the driving motor.

21. A device as recited in claim 20 wherein the rapid stop and intermediate stop keys (7, 6) rotate a switch shaft (95) which causes a contact lever (102) and the switch shifter (103) for the driving motor to be moved.

22. A device as recited in claim 21 further characterized by pivotable subscriber keys (5) which engage a control bar (12) the end of which facing the cipher magazine has a nose (20) on which the holding nose (21) of a cipher magazine bears in the inoperative position of the magazine; wherein adjacent grooves (26, 27) are provided which engage a locking bar (28) to arrest the position of the control bar (12); and wherein on the other end of the control bar (12) a switch bar (16) is provided which acutates the delay switch (18) and which has a locking bar (30) which engates with a locking lever (109) to release the feed pawl mechanism (38, 112) from the toothed segment (32) until said supporting bar (41) reaches its operative position.

23. A device as recited in claim 22 characterized by a contact bar (120) mounted at such a distance above the support (41) that the cipher magazine moved is raised above the inoperative position until a holding nose (21) is located above a said nose (20) on the control bar (12), whereby the support (41) is relieved of the weight of the cipher magazines (22).

24. A device as recited in claim 22 wherein the stop bar (120) is located on one end of a bell crank lever the other end of which has a stop (121) which, arranged under the locking bar (28), raises the locking bar before switching off the driving motor.

25. A device as recited in claim 2 wherein the projections (50) of the cipher magazines comprise pivotable toothed discs (138).

26. A device as recited in claim 2 further characterized by a pinion (86) for the winding device which is connected through a clutch with a counting dial.

27. In a device for transmitting current pulses for telephone or telewriting installations, said device having a number store which includes cipher magazines and scanning members which are moved by a mechanical device, the drive being connected by a clutch which connects the drive with an impulse transmitter until a member of the impulse transmitter completes a winding movement the extent of which is determined by the number store and which thereafter releases the impulse transmitter for transmission of current pulses, the improvement comprising a plurality of spring-biased projections (50) on the magazines (22) whose extent of projection from the magazines is adjustable, means (5) for bringing the magazines individually into a scanning position, means for moving the scanning members in a horizontal direction for scanning of one and then another of said projections (50), means for moving the position of a magazine to a different position after it has been scanned by the scanning members, and means for energizing the impulse transmitter when scanning is commenced and for de-energizing the impulse transmitter when a magazine has been moved to a said different position.

28. A device as recited in claim 27 having a means (137) projecting between a pair of said projections (50) for restricting the winding movement of the transmitter during a portion of the period of scanning to providing a grouping of current pulses.

References Cited

UNITED STATES PATENTS

| | | | |
|---|---|---|---|
| 2,929,884 | 3/1960 | Verdesca | 179—90 |
| 2,952,740 | 9/1960 | Montrose | 179—90 |
| 1,891,633 | 12/1932 | Batdorf | 179—90 |
| 2,355,437 | 8/1944 | Heptinstall | 179—90 |

KATHLEEN H. CLAFFY, Primary Examiner

W. A. HELVESTINE, Assistant Examiner